US009348043B2

(12) United States Patent
Fu et al.

(10) Patent No.: US 9,348,043 B2
(45) Date of Patent: *May 24, 2016

(54) MULTI-COIL MULTI-TERMINAL CLOSED-LOOP GEOPHONE ACCELEROMETER

(71) Applicant: SAS E&P LTD., Calgary (CA)

(72) Inventors: Zhentang Fu, Calgary (CA); Chunhua Gao, Calgary (CA); Du Chen, Katy, TX (US)

(73) Assignee: SAS E&P LTD., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,858

(22) Filed: Mar. 24, 2014

(65) Prior Publication Data

US 2014/0293752 A1 Oct. 2, 2014

Related U.S. Application Data

(63) Continuation-in-part of application No. 14/167,552, filed on Jan. 29, 2014.

(60) Provisional application No. 61/807,635, filed on Apr. 2, 2013.

(51) Int. Cl.
*H04R 1/00* (2006.01)
*H04R 9/06* (2006.01)
(Continued)

(52) U.S. Cl.
CPC . *G01V 1/184* (2013.01); *B06B 1/04* (2013.01); *G01V 1/162* (2013.01); *G01V 1/18* (2013.01);
(Continued)

(58) Field of Classification Search
CPC ....... G01V 1/182; G01V 13/00; G01V 1/162; G01V 1/18; G01V 1/181; G01V 1/183; G01V 1/184; H04R 9/04; B06B 1/04
USPC .......................................................... 381/401
See application file for complete search history.

(56) References Cited

U.S. PATENT DOCUMENTS 4,051,718 A 10/1977 Meckl et al.
5,119,345 A 6/1992 Woo et al.
(Continued)

FOREIGN PATENT DOCUMENTS

CN 1161456 A 10/1997
CN 102628960 A 8/2012
(Continued)

OTHER PUBLICATIONS

"Building a Seismograph from Scrap," by Panteleimon Bazanos, published in Science in School, Issue 23: Summer 2012 found in http://www.scienceinschool.org/sites/default/files/teaserPdf/issue23_earthquakes.pdf.
(Continued)

*Primary Examiner* — Matthew Eason
*Assistant Examiner* — Sean H Nguyen
(74) *Attorney, Agent, or Firm* — Parlee McLaws LLP (CGY); Sean Goodwin

(57) ABSTRACT

An apparatus and a method for detecting vibration are disclosed. The apparatus comprises a housing, a magnetic structure forming a magnetic field in the housing, and a coil structure in the magnetic field, concentric of the magnetic structure. In response to external vibration, the coil structure and the magnetic structure are movable with respect to each other. The coil structure comprises at least two sets of coils overlapped in space, of which a first coil set is for detecting vibration and a second coil set is for applying control in accordance with a control signal.

23 Claims, 21 Drawing Sheets

(51) Int. Cl.

| | |
|---|---|
| ***H04R 11/02*** | (2006.01) |
| ***G01V 1/18*** | (2006.01) |
| ***H04R 9/04*** | (2006.01) |
| ***G01V 1/16*** | (2006.01) |
| ***G01V 13/00*** | (2006.01) |
| ***B06B 1/04*** | (2006.01) |

(52) U.S. Cl.
CPC ................ *G01V 1/181* (2013.01); *G01V 1/182* (2013.01); *G01V 1/183* (2013.01); *G01V 13/00* (2013.01); *H04R 9/04* (2013.01)

(56) References Cited

U.S. PATENT DOCUMENTS

| | | | | |
|---|---|---|---|---|
| 5,172,345 | A | 12/1992 | Van Der Poel | |
| 5,323,133 | A * | 6/1994 | Heath et al. | 335/222 |
| 5,469,408 | A | 11/1995 | Woo | |
| 6,922,374 | B2 | 7/2005 | Hagedoorn et al. | |
| 8,000,171 | B2 | 8/2011 | Hache et al. | |
| 8,139,439 | B2 | 3/2012 | Kamata | |
| 2011/0007609 | A1 * | 1/2011 | Woo | 367/183 |
| 2012/0063263 | A1 * | 3/2012 | Kamata | 367/38 |

FOREIGN PATENT DOCUMENTS

| | | | |
|---|---|---|---|
| CN | 102901982 | A | 1/2013 |
| CN | 202886621 | U | 4/2013 |
| EP | 0110431 | A1 | 6/1984 |
| EP | 0434702 | B1 | 3/1994 |
| RU | 2207522 | C | 6/2003 |
| WO | 90/01712 | A1 | 2/1990 |

OTHER PUBLICATIONS

CIPO Examiner's Requisition for CA 2,840,916 dated May 21, 2015.

* cited by examiner

MULTI-COIL MULTI-TERMINAL CLOSED-LOOP GEOPHONE ACCELEROMETER

CROSS-REFERENCE TO RELATED APPLICATIONS

This application is a continuation-in-part of the U.S. patent application Ser. No. 14/167,552 filed on Jan. 29, 2014, which claims the benefits under 35 U.S.C 119(e) of the U.S. Provisional Application Ser. No. 61/807,635, filed on Apr. 2, 2013, the subject matter of which is incorporated fully herein by reference.

FIELD OF THE DISCLOSURE

The present disclosure generally relates to a seismic data acquisition apparatus, and in particular, a multiple-coil, multiple-terminal geophone accelerometer.

BACKGROUND

Vibration sensors have been used in a variety of areas such as oil and gas exploration, vibration monitoring of buildings, bridges and other civil constructions. As vibration sensors for seismic exploration, earthquake and building vibration monitoring are usually powered by batteries, vibration sensors with low power consumption are generally preferred. Also, it is preferable that vibration sensors are low cost and reliable, and have a wide frequency bandwidth.

Conventional geophones are a type of vibration sensors having g been widely used for many years. Geophones have a coil movable in a magnetic field. Movement of the coil, triggered by external vibration, develops an electronic voltage across the coil terminals, which may be used for determining the characteristics of the external vibration.

For example, European Patent Publication No. 0,110,431 teaches an acceleration-responsive geophone of the type employing a transducer including a sensor coil and a drive coil which are both disposed in a magnetic field produced by a magnet structure. The magnet structure and the coils are mounted within a housing for movement relative to each other. The magnet structure is arranged to reduce the electromagnetic coupling between the sensor coil and the drive coil to substantially zero. The sensor coil is coupled to the input of an electronic amplifier having its output coupled to the drive coil to provide a feedback circuit. The transducer-amplifier combination has the behaviour of a bandpass filter. In order to render the combination substantially temperature-independent, while maintaining its bandpass characteristics over a wide temperature range, the amplifier is a transconductance amplifier having an input impedance and an output impedance which are highly relative to the impedance of the sensor coil and the impedance of the drive coil, respectively. A substantially temperature-independent resistor is connected in series to the drive coil, and connected to an output terminal via which the output signal of the transducer-amplifier can be collected.

U.S. Pat. No. 5,172,345, also published as European Patent No. 0,434,702 and PCT Patent Application No. PCT/NL89/00063, teaches a geophone system for measuring mechanical vibrations such as seismic waves. The geophone system includes a mechanical transducer with an electronic processing circuit. The mechanical transducer includes an inertial mass adapted to be excited by an input acceleration signal and by a force transducer. The excitation is detected by a sensor element and the processing circuits of the geophones control the force transducer and are connected with a central station via a transmission line.

Conventional geophones are reasonably low cost, power efficient and generally reliable. However, their frequency bandwidth is generally narrow (frequency response dropping approximately 12 dB/octave), and their total harmonic distortion (THD) is generally high (approximately 0.1% or −60 dB), rendering them unsatisfactory in the evolving market.

Conventional geophones usually have poor frequency response at low frequency range. As low frequency seismic signals are becoming more commonly used in the seismic industry, for instance, vibrator sweeping frequency now usually starting at approximately 2 Hz or lower, the conventional geophones do not meet the needs of monitoring low frequency vibrations. A sensor with wide bandwidth, in particular with good frequency response in low frequency range, is therefore desired.

Other vibration sensors, such as open-loop and closed-loop micro electromechanical systems (MEMS) sensors, are also available. Based on the sensor structure, they are categorized into two classes: open-loop vibration sensors and closed-loop vibration sensors. The conventional geophones are also open-loop vibration sensors.

Similar to conventional geophones, open-loop vibration sensors are generally economic, reliable, and power efficient. Some open-loop vibration sensor arrangements do not even need a power supply at all, although open-loop MEMS sensors do require power and are an example of an exception to the generalization of being power efficient. However, open-loop vibration sensors generally have a very limited frequency bandwidth and poor THD qualities.

Comparing to open-loop vibration sensors, the dosed-loop vibration sensors, such as dosed-loop MEMS sensors, have generally larger bandwidth with a range of approximately 3 to 375 Hz and lower THD of approximately 0.001% or −100 dB. However, these sensors are expensive and fragile, rendering them unreliable in some use scenarios.

Moreover, dosed-loop MEMS vibration sensors are power inefficient. For example, the power consumption of a dosed-loop MEMS sensor may be as high as 125 mw or higher. The relatively high power consumption requirement severely prevents dosed-loop MEMS sensors from successful entry into the seismic market.

Therefore, there is a desire for a vibration sensor that has small total harmonic distortion, a wide frequency bandwidth with good frequency response at low frequencies, and low power consumption.

SUMMARY

According to one aspect of this disclosure, an apparatus for detecting vibration comprises: a housing; a magnetic structure forming a magnetic field in the housing; and a coil structure comprising two or more sets of coils overlapped in said magnetic field concentric with the magnetic structure, said two or more sets of coils comprising at least two sets of coils being intermingled; wherein in response to said vibration, said coil structure and said magnetic structure are movable with respect to each other with the moving directions transverse the directions of the magnetic flux of the magnetic field.

According to another aspect of this disclosure, at least a first set of coils of the apparatus outputs a sensing signal indicative of vibration. Alternatively, two or more sets of coils of the apparatus may be connected for outputting a sensing signal indicative of vibration.

According to yet another aspect of this disclosure, at least a second set of coils of the apparatus receives a control signal for controlling the response of the apparatus to vibration. Alternatively, two or more sets of coils of the apparatus may be connected for receiving a control signal for controlling the response of the apparatus to vibration.

The response of the apparatus to vibration may be the sensitivity to vibration and/or the frequency response to vibration. The control signal may be a function of the sensing signal.

According to another aspect of this disclosure, some or all sets of coils may be wound in the same direction. Alternatively, some sets of coils may be wound in opposite directions.

According to another aspect of this disclosure, the apparatus further comprises at least two groups of electrical terminals connectable from outside the housing, each group of electrical terminals connecting at least one set of coils.

The electrical terminals may be marked by marks for indicating the phase relationship of signals on said two or more sets of coils. The marks may be on the respectively terminal and/or on the housing. The marks may include color marks, stripes or the like.

The electrical terminals may be marked by marks for indicating the groups of the electrical terminals.

According to another aspect of this disclosure, a controller may be electrically connected to the apparatus for controlling the response of said apparatus to external vibration. The controller may be external to the apparatus, or alternatively, the controller may be a printed circuit board incorporated in the housing of said apparatus.

According to another aspect of this disclosure, a method of detecting vibration comprises:

forming a magnetic field;

intermingling at least a first coil set and a second coil set in space;

positioning the at least a first coil set and a second coil set in said magnetic field such that, in response to said vibration, the magnetic field and the at least a first coil set and a second coil set are movable with respect to each other with moving directions transverse the directions of the magnetic flux of the magnetic field;

detecting, from said first coil set, a sensing signal bearing information of said vibration; and applying a control signal to said second coil set for controlling said sensing signal.

BRIEF DESCRIPTION OF THE DRAWINGS

FIGS. 15A and 158 show the relationship between the direction of the force generated by the current in a coil set and the winding direction of the coil set;

DETAILED DESCRIPTION

Figure 1:
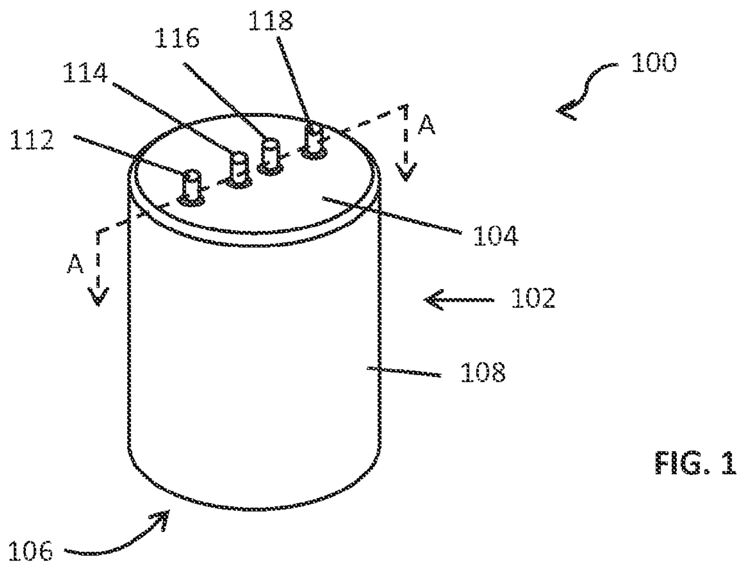
FIG. 1 is a perspective view of a dual-coil, four-terminal geophone, according to one embodiment.
Figure 2:
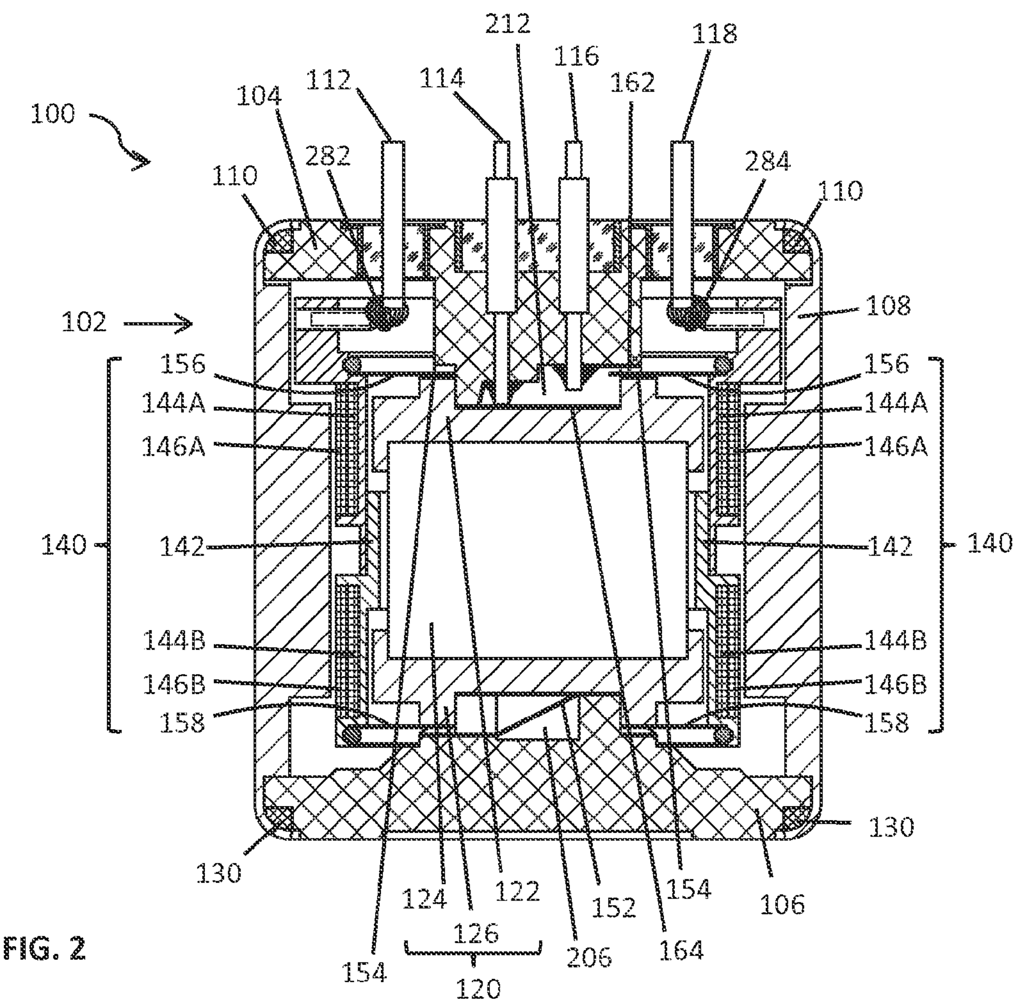
FIG. 2 is a cross-sectional view of the geophone of FIG. 1 along section A-A.

With reference to FIGS. 1 and 2, a four-terminal geophone 100 comprises a cylindrical housing 102 having a cap 104, a base 106, and a cylindrical wall 108 extending therebetween. In this embodiment, the cylindrical wall 108 is mechanically and sealably coupled to the cap 104 and the base 106, respectively, using a crimping structure with seal elements 110, 130 such as O-rings therebetween.

Figure 3:
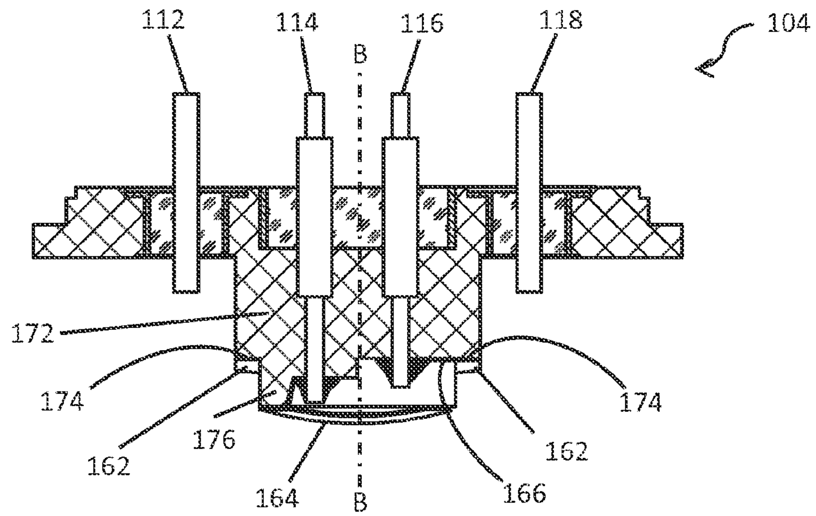
FIG. 3 is an enlarged, cross-sectional view of the cover of the geophone of FIG. 2.

Referring to FIGS. 2 and 3, the cap 104 comprises a central portion 172 extending downwardly from a bottom surface. The central portion 172 comprises an annular shoulder 174 along its periphery and a downwardly extending extrusion 176 spaced radially inwardly from the shoulder 174. An electrical contactor 162 is mounted on the shoulder 174, and is connected to a terminal 116 via an electrically conductive wire or connection 166. A downwardly biased reed or spring plate electrical contactor 164 is mounted on the extrusion 176 and extending generally horizontally towards a central axis B of the cap 104.

The cap 104 comprises four terminals 112 to 118 extending outwardly from the inner side of the cap 104 to the outer side thereof for electrically connecting to external signal processing circuits and/or devices (not shown). The bottom end of terminal 114 is positioned about the spring plate contactor 164 such that it is in electrical contact with the spring contactor 164 when the geophone is assembled. Other terminals 112, 116 and 118 are electrically isolated from the spring plate contactor 164.

Figure 4:
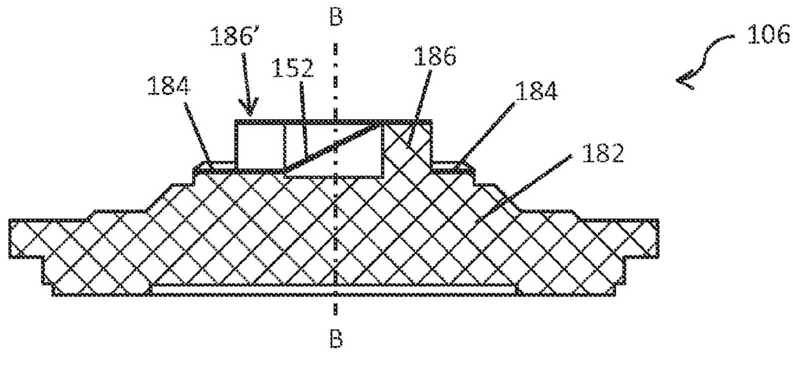
FIG. 4 is an enlarged, cross-sectional view of the base of the geophone of FIG. 2.

Referring to FIGS. 2 and 4, the base 106 comprises a central portion 182 extending upwardly from a top surface. The central portion 182 comprises an annular shoulder 184 along its peripheral and an upwardly extending annular extrusion 186 spaced radially inwardly from the shoulder 184. The annular extrusion 186 is discontinuous, forming a gap 186' for allowing a portion of a spring plate electrical contactor 152 to pass diametrically therethrough. The spring plate contactor 152 is mounted on the shoulder 184, a portion of which passes through the gap 186' and extends upwardly and inwardly from the shoulder 184 to the top surface of the extrusion 186.

Referring back to FIGS. 1 and 2, the cylindrical wall 108 is made of a suitable ferromagnetic material, such as steel, iron, nickel, cobalt or the alloy thereof, to facilitate a magnetic structure 120 in forming a desired magnetic field (described later). In this embodiment, the cap 104 and the base 106 are made of rigid plastic to provide mechanical strength for supporting the components enclosed in the housing 102.

Figure 5:
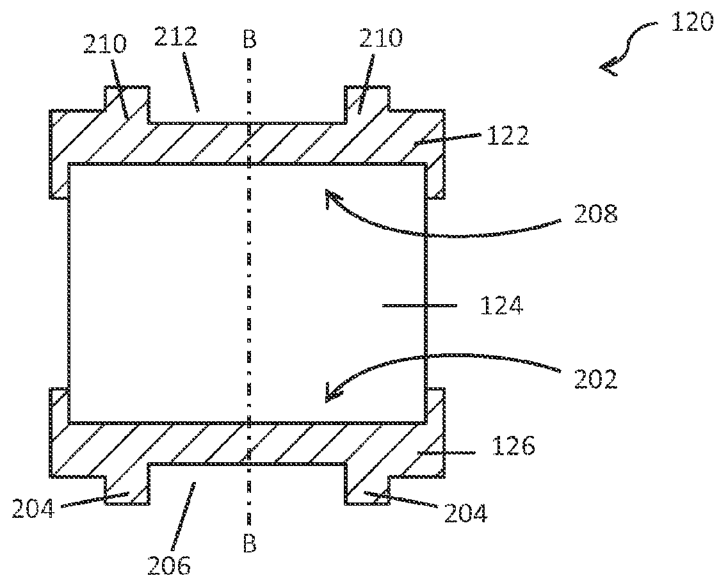
FIG. 5 is an enlarged, cross-sectional view of the magnetic structure of the geophone of FIG. 2.

In this embodiment, the housing 102 encloses therein an axially movable, annular coil structure 140 and the magnetic structure 120 positioned inside the annular coil structure 140, with their longitudinal axes coinciding or concentric. The magnetic structure 120 is fixed or sandwiched between the cap 104 and the base 106. FIGS. 3, 4 and 5 illustrate the cap 104, the magnetic structure 120 and the base 106 shown in exploded arrangement aligned along common axis B.

Referring to FIG. 2, the magnetic structure 120 is an axially extending, cylindrical structure axially firmly fit within the housing 102 between the cap 104 and the base 106. Herein, the geophone is displayed with its axis shown vertically. Therefore, herein, the term "vertically" and "axially" are used interchangeably without restricting the actual orientation of the axis to vertical. The magnetic structure 120 has a diameter smaller than that of the housing 102 such that an annular space is formed between the magnetic structure 120 and the housing 102 for accommodating the movable coil structure 140.

Referring to FIGS. 3, 4 and 5, the magnetic structure 120 is guided axially within the housing 102, and comprises a magnet block 124 coupled to an upper magnetic boot 122 thereabove, and coupled to a lower magnetic boot 126 therebelow. In this embodiment, the lower magnetic boot 126 has a diameter larger than that of the magnetic block 124, and comprises a first recess 202 on its upper surface for receiving the bottom of the magnetic block 124. The lower magnetic boot 126 also comprises a ring ridge 204 on its bottom surface, centered about the longitudinal axis B-B of the magnetic structure 120 and extending downwardly to form a second recess 206. The position of the ring ridge 204 matches that of the shoulder 184 of the base 106 such that, when assembled, the ring ridge 204 rests upon the shoulder 184, and the outer sidewall of the extrusion 186 of the base 106 is in contact with the inner sidewall of the second recess 206 of the lower magnetic boot 126 to guide the magnetic structure 120 and to prevent the magnetic structure 120 from moving horizontally. Moreover, the height of the ring ridge 204 is such that its bottom surface engages the top surface of the extrusion 186 of the base 106 when assembled.

Similarly, the upper magnetic boot 122 has a diameter larger than that of the magnetic block 124, and comprises a first recess 208 on its bottom surface for fitting to the top of the magnetic block 124. The upper magnetic boot 122 also comprises an annular ring ridge 210 on its top surface, centered about the longitudinal axis B of the magnetic structure 120 and extending upwardly to form a second recess 212. The radial position of the ring ridge 210 matches that of the shoulder 174 of the base 106 such that, when assembled, the ring ridge 210 is positioned under the shoulder 174 and the outer sidewall of the extrusion 176 of the cap 104 is in contact with the inner side all of the second recess 212 of the upper magnetic boot 122, preventing the magnetic structure 120 from moving horizontally. Moreover, the height of the ring ridge 210 matches that of the extrusion 176 of the cap 104 such that the top surface of the recess 212 engages the bottom surface of the extrusion 176 of the cap 104 when assembled.

Figure 6:
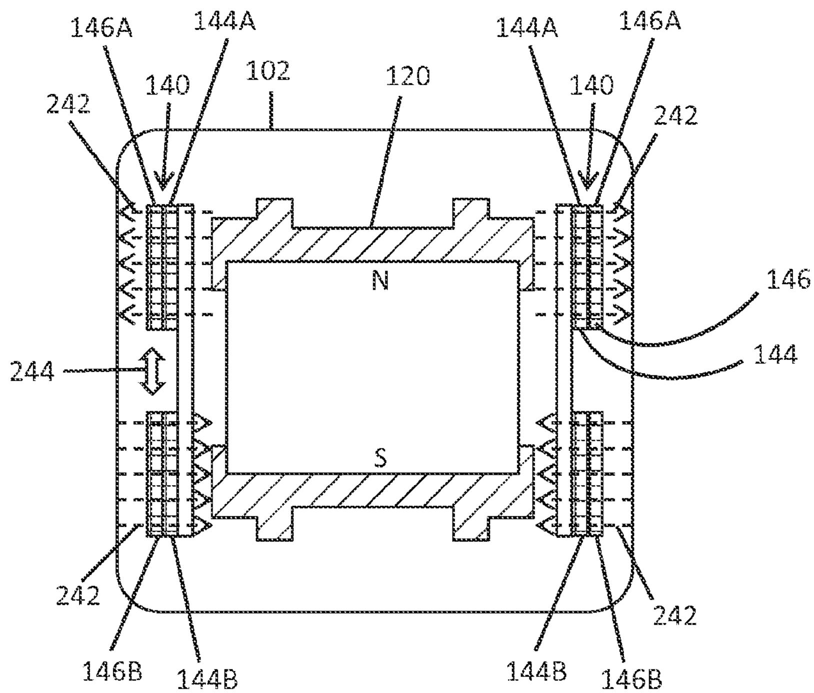
FIG. 6 illustrates the magnetic field formed by the magnetic structure of the geophone of FIG. 2, with arrows indicating magnetic flux.

In this embodiment, the magnetic block 124 is a permanent magnet, and the upper and lower magnetic boots 122 and 126 are made of ferromagnetic material such as steel, iron, nickel, cobalt, or the alloy thereof. The magnetic block 124 and the upper and lower magnetic boots 122 and 126 form a stable, circular magnetic field inside the housing 102. As the cylindrical wall 108 is also made of a suitable ferromagnetic material, it regulates the magnetic field formed by the magnetic structure 120 such that the magnetic flux of the magnetic field is generally distributed horizontally in the annular space between the magnetic structure 120 and the housing 102, as illustrated in FIG. 6, indicated by the arrows 242.

Figure 7:
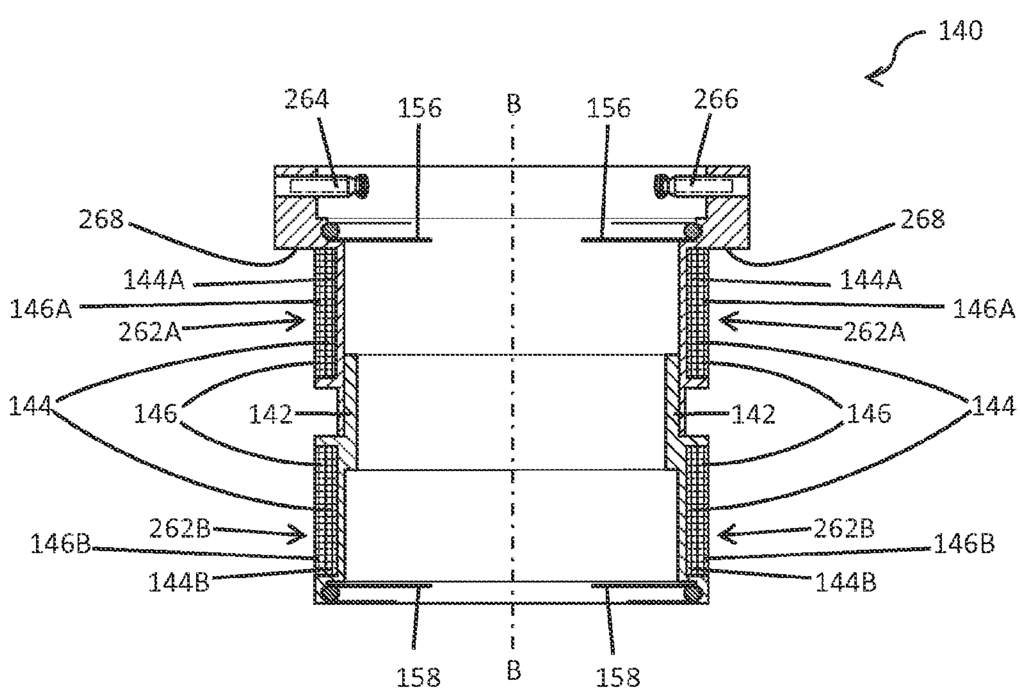
FIG. 7 is an enlarged, cross-sectional view of the movable coil structure of the geophone of FIG. 2.

With reference also to FIG. 7, the movable coil structure 140 comprises a bobbin 142 for supporting coil windings thereon. The bobbin 142 in this embodiment is a tubular or hollow cylindrical structure made of aluminum or aluminum alloy processed by anodic oxidation treatment to form an electrically insulating coat of anodic oxide film on its surface. The upper end of the bobbin 142 slightly extends radially outwardly to form a shoulder 268 generally facing downwardly. The upper end of the bobbin 142 comprises a pair of electrical terminals 264 and 266 mounted thereon, and generally inwardly extending from the inner surface thereof. The electrical terminals 264 and 266 are electrically insulated from the bobbin 142.

The upper end of the bobbin 142 also comprises at least one hole (not shown) for wiring a coil set 144 (described later) therethrough to connect to the electrical terminals 264 and 266. On its exterior sidewall, the bobbin 142 comprises a pair of axially-spaced recesses, including an upper annular recess 262A and a lower annular recess 262B, for receiving coils wound therein.

The movable coil structure 140 also comprises a top annular metal spring plate 156 and a bottom annular metal spring plate 158 mounted on the upper and lower ends of the bobbin 142, respectively. The top annular spring plate 156 extends generally horizontally and inwardly from the inner side surface of the bobbin 142 to a position about the ring ridge 210 of the upper agnetic boot 122. The bottom annular spring plate 158 also extends generally horizontally and inwardly from the inner side surface of the bobbin 142 to a position about the ring ridge 204 of the lower magnetic boot 126.

The movable coil structure 140 further comprises two sets of coils 144 and 146 wound on the bobbin 142, with the inner coil set 144 being radially offset inwardly within the outer coil set 146 and electrically isolated from one another. Each coil set 144 and 146 comprises one or more turns of coil windings. The inner coil set 144 is wound on the bobbin 142, and comprises an upper portion 144A wound in the upper recess 262A of the bobbin 142 and a lower portion 144B wound in the lower recesses 2628 thereof. The winding direction of the lower portion 144B of coil set 144 is opposite to that of the upper portion 144A thereof. One end of the inner coil set 144 is connected to the electrical terminal 264, and the other end thereof is connected to the electrical terminal 266.

Figure 9:
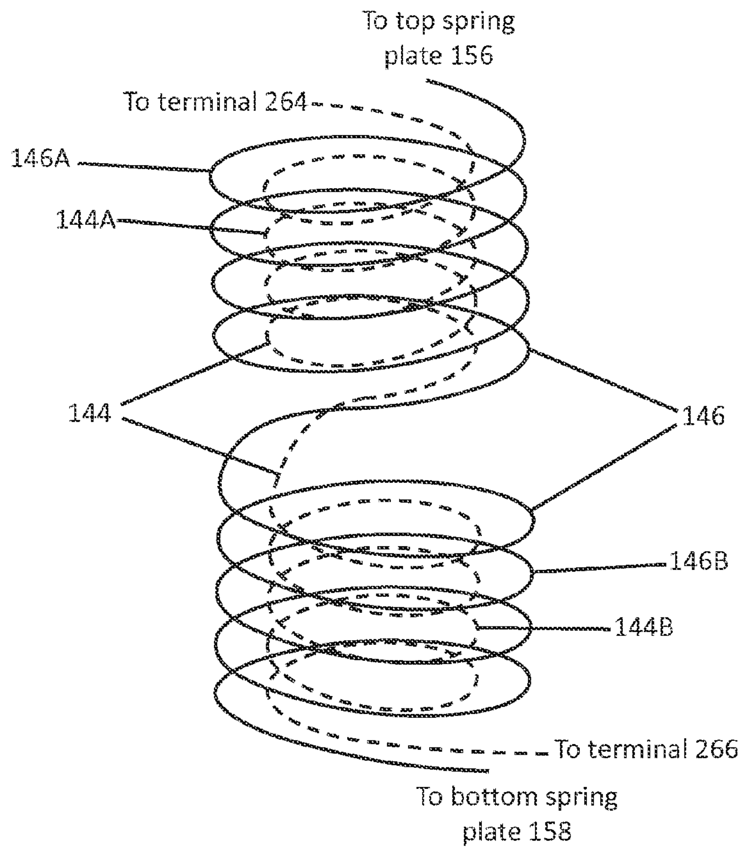
FIG. 9 is a simplified three-dimensional illustration of the windings of the inner and outer coil sets of the movable coil structure of FIG. 7.

The outer coil set 146 is wound over the inner coil set 144. Similar to the inner coil set 144, the outer coil set 146 also comprises an upper portion 146A and a lower portion 146B. As shown in FIG. 9, the upper portion 146A of coil set 146 is wound over the upper portion 144A of coil set 144 in the upper recess 262A of the bobbin 142, and the lower portion 1468 of coil set 146 is wound over the lower portion 144B of coil set 144 in the lower recess 262B of the bobbin 142, with a winding direction opposite to that of the upper portion 146A. In this embodiment, the upper and lower portions 146A and 146B of the outer coil set 146 are directly wound on the upper and lower portions 144A and 144B of the inner coil set 144, respectively. However, those skilled in the art appreciate that the outer coil set 146 may be wound over the inner coil set 144 with an annular separation therebetween. For example, the inner coil set 144 may be wrapped by a piece of protection paper and the outer coil set 146 is wound on the protection paper.

Hereinafter, each coil set has a hollow cylindrical shape. The space occupied by a coil set includes the space occupied by the windings of the coil set, and the inner space enclosed by the coil windings. The inner and outer coil sets 144 and 146 are therefore overlapped in space in the sense that the space occupied by the inner coil set 144 is within that taken by the outer coil set 146.

The outer coil set 146, the inner coil set 144 and the magnetic structure 120 are in a concentric configuration with longitudinal axes B-B that coincide. One end of the outer coil set 146 is electrically connected to the top spring plate 156, and the other end of the outer coil set 146 is electrically connected to the bottom spring plate 158. FIG. 9 shows a simplified three-dimensional illustration of the positions of inner and outer coil sets 144 and 146.

When assembled as shown in FIG. 2, the cylindrical sidewall 108 is crimped onto the base 106. O-ring 130 is used to seal the interface between the sidewall 108 and the base 106. Inside the sidewall 108, the magnetic structure 120 is fit onto the base 106. In particular, the ring ridge 204 of the lower magnetic boot 126 rests upon the shoulder 184 of the base 106 with the bottom spring plate 158 of the movable coil structure 140 sandwiched therebetween. The inner sidewall of the ring ridge 204 engages the outer sidewall of the extrusion 186 of the base 106 to prevent the magnetic structure 120 from moving horizontally.

As the bottom spring plate 158 of the movable coil structure 140 is sandwiched between the ring ridge 204 of the lower magnetic boor 126 and the shoulder 184 of the base 106, the bottom spring plate 158 of the movable coil structure 140 is in contact with the spring plate contactor 152 on the shoulder 184 of the base 106 therebelow, and is also in contact with the ring ridge 204 of the lower magnetic boot 126 thereabove. The spring plate 152, in turn, is in contact with the bottom surface of the second recess 206 of the lower magnetic boot 126.

The housing 102 comprises top and bottom annular recesses for receiving the cap 104 and base 106, respectively, and spacing them apart. When assembled, the top spring plate 156 of the movable coil structure 140 is in contact with the electrical contactor 162 on the shoulder 174 of the cap 104 thereabove. However, the top spring plate 156 of the movable coil structure 140 rests on the ring ridge 210 of the upper magnetic boot 122 therebelow via an insulation washer 154 such that the top spring plate 156 is electrically insulated from the ring ridge 210 of the upper magnetic boot 122.

As the height of the ring ridge 210 of the upper magnetic boot 122 matches that of the extrusion 176 of the cap 104, when assembled, the top surface of the second recess 212 of the upper magnetic boot 122 is pressed against the spring contactor 164, which, in turn, is pressed against the terminal 114 in the cap 104. The electrical terminals 264 and 266 are connected to terminals 112 and 118 via spring electrical wires 282 and 284, respectively.

After the cap 104 is pressure-fit and crimped to the top of the cylindrical sidewall 108, the cap 104 presses the magnetic structure 120 to the base 106 to axially firmly fix the magnetic structure 120 in the housing 102. The movable coil structure 140 is mounted in the housing 102 with the upper spring plate 156 being firmly held between the cap 104 and the upper magnetic boot 122, and the lower spring plate 158 being firmly held between the lower magnetic boot 126 and the base 106. The movable coil structure 140 is therefore constrained laterally, but movable axially within the housing 102 upon external force, such as seismic motions, urging the geophone 100.

The four terminals 112 to 118 are divided into two terminal groups, each connecting to a coil set 144 or 146 when the geophone 100 is assembled. Two circuits are thus formed.

Figure 8A:
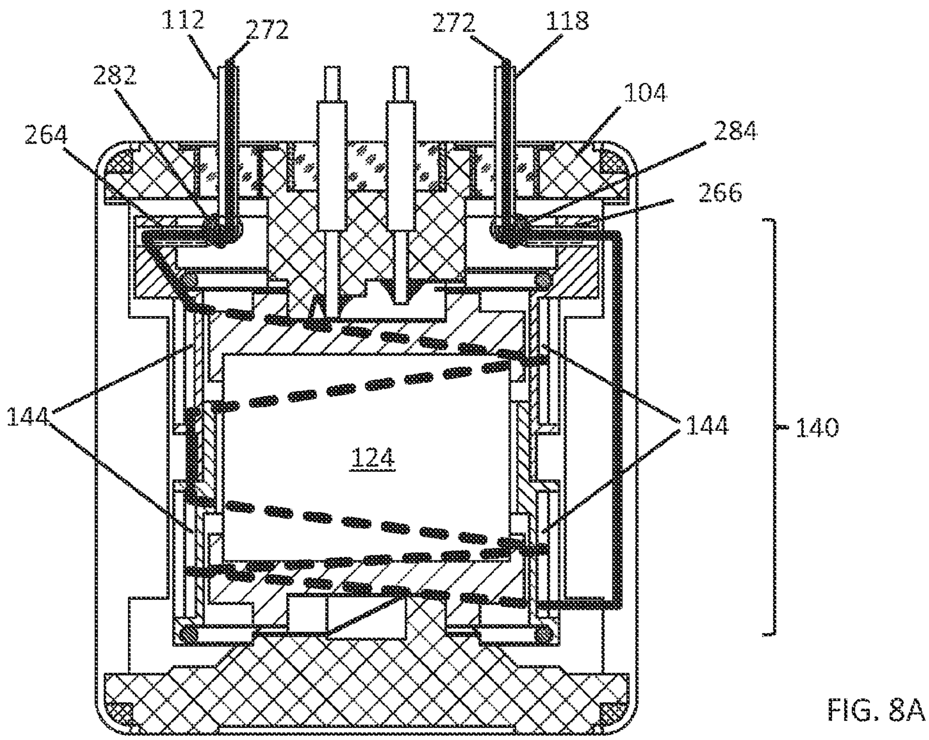
FIGS. 8A and 8B illustrate the two circuits formed in the geophone of FIG. 2, connecting the two sets of coils, respectively.
Figure 8B:
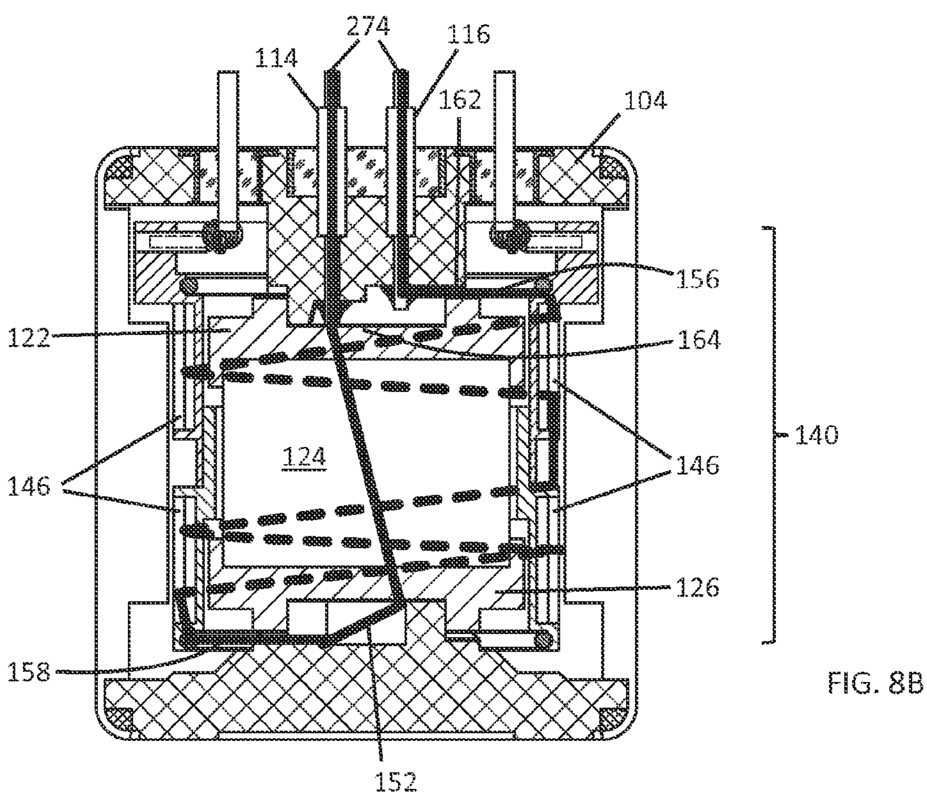

FIGS. 8A and 8B illustrate the two circuits represented by the thick lines 272 and 274, respectively, where the dashed, thick line segments represent the winding coils. Those skilled in the art appreciate that these figures are for illustrative purpose only, and do not necessary represent the physical wiring in the geophone 100.

As shown in FIG. 8A, the first circuit 272 includes the terminal 112 on the cap 104, which is electrically conductively connected via the electrical wire 282 to the terminal 264 on the movable coil structure 140. The terminal 264, in turn, is conductively connected to one end of the inner coil set 144. The other end of the inner coil set 144 is conductively connected to the terminal 266 on the movable coil structure 140, which is conductively connected to the terminal 118 on the cap 104 via the electrical wire 284. The first circuit 272 is completed when the terminals 112 and 118 are connected to an external electrical circuit and/or device.

As shown in FIG. 8B, the second circuit 274 includes the terminal 114 on the cap 104, conductively connecting via the electrical contactor 164 to the upper magnetic boot 122. The upper magnetic boot 122 is in turn conductively connected to the magnet block 124 and the lower magnetic boot 126 as they are made of electrically conductive material. The lower magnetic boot 126 is conductively connected via the electrical contactor 152 to the bottom spring plate 158, which is connected to one end of the outer coil set 146. The other end of the outer coil set 146 is connected to the top spring plate 156. The top spring plate 156 is conductively connected to the terminal 116 via the electrical contactor 162. The top spring plate 156 is electrically insulated from the upper magnetic boot 122 to avoid forming a short circuit. The second circuit 274 is completed when the terminals 114 and 116 are connected to an external electrical circuit and/or device.

In use, one or more geophones 100 may be deployed in a jobsite, buried or attached to the ground or an object, or incorporated in a downhole tool in a wellbore, for sensing vibration or seismic motions. Vibration of the object causes the housing 102 and the magnetic structure 120 to vibrate axially. Spring plates 156 and 158 enable axial movement of the coil structure 140 relative to the magnetic structure 120. As the coil structure 140 is axially and moveably suspended to the housing via spring plates 156 and 158, it axially vibrates with a time lag because of the inertia thereof. Therefore, effectively, the coil structure 140 is axially vibrating with respect to the magnetic structure 120. As illustrated in FIG. 6, the moving direction 244 of the coil sets 144 and 146 is generally perpendicular to the direction 242 of the magnetic flux and the winding direction of the coil sets 144 and 146.

As is well known to the skilled person in the art, the movement of a conductor in a magnetic field with a moving direction transverse the direction of the magnetic flux causes a voltage with a direction perpendicular to both the direction of the magnetic flux and the moving direction of the conductor. On the other hand, an electrical current flowing in a conductor in a magnetic field with a direction of the current transverse that of the magnetic flux will causes a mechanical force with a direction perpendicular to both the direction of the current and that of the magnetic flux. The geophone 100 has two sets of coils 144 and 146. Therefore, one of the inner and outer coil sets 144 and 146, e.g., the inner coil set 144 in this embodiment, is used for sensing vibration, and the other of the inner and outer coil sets 144 and 146, e.g., the outer coil set 146, is used for regulating the movement of the coil structure 140 to control the response, such as the sensitivity and/or frequency response, of the geophone 100 to external vibration.

Figure 10:
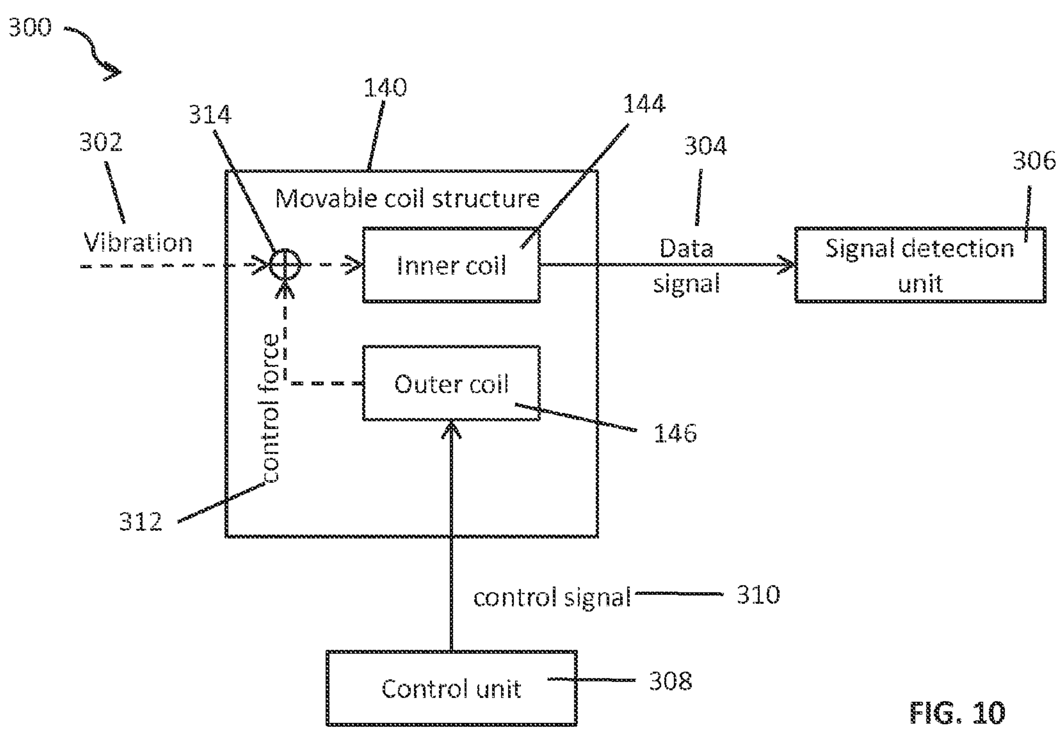
FIG. 10 illustrates a schematic of a generalized vibration detection system employing a geophone, according to embodiments described herein.

FIG. 10 illustrates a generalized vibration detection system employing a geophone 100. In this figure, the solid lines represent the electrical paths, and the broken lines represent the mechanical force paths.

As shown in FIG. 10, external vibration 302, which is a mechanical force with varying strength and direction, applied to the geophone 100 causes the coil structure 140 to move in the magnetic field of the magnetic structure 120, which generates an electrical sensing signal 304 that is detected by the signal detection unit 306. As the skilled person understands, the sensing signal 304 bears the information of the vibration 302. A signal processing unit (not shown) in the signal detection unit calculates the characteristics of the vibration 302 based on the electrical sensing signal 304. The ability of determining the characteristics of the vibration 302 based on the electrical sensing signal 304 may be described in terms of the frequency response and the sensitivity of the system 300 to the vibration 302.

In the meantime, a control unit 308 applies a control signal 310 to the outer coil set 146, which causes a mechanical control force 312 superimposed (314) with the vibration 302 and applied to the movable coil structure 140. By applying a carefully designed control signal 310 in accordance with the vibration 302 and/or the electrical and mechanical characteristics of the geophone 100, the strength and direction of the applied control force may be adjusted to control the sensing signal such that the response, such as the sensitivity and/or frequency response, of the geophone 100 to the external vibration is improved. In some embodiments, the control unit 308 generates the control signal 310 based on the sensing signal 304 detected by the signal detection unit 306, i.e., the control signal 310 is a function of the sensing signal 304, forming a closed-loop control system. In some other embodiments, the control unit 308 generates the control signal 310 based on other measurement, e.g., a direct measurement of the vibration, obtained using devices or components independent to the signal detection unit 306, forming an open-loop control system.

As skilled persons in the art appreciate, an axially oriented magnet, such as the magnetic structure 120 of the geophone 100, provides a magnetic field with an upper, and a lower, three-dimensional area having strongest magnetic field strength about the top and bottom ends thereof, respectively. Some prior art geophones, such as that disclosed in the aforementioned U.S. Pat. No. 5,172,345, comprise a signal-output coil positioned about the top end of the magnetic structure and a control coil positioned about the bottom end of the magnetic structure. Thus, neither the signal-output coil nor the control coil fully utilizes the magnetic field.

On the other hand, in the geophone 100 disclosed herein, the inner and outer coil sets are overlapped in space, each coil set having a first portion of coil and a second portion of coil positioned in the upper and lower areas of the strongest magnetic field strength, respectively. Therefore, both the inner coil set 144 and the outer coil set 146 utilize substantially the entire magnetic field provided by the magnetic structure 120 for generating vibration-related sensing signal 304 and for applying control based on the control signal, respectively, giving rise to improved frequency response and/or sensitivity to vibration.

Other embodiments are also readily available. For example, in an alternative embodiment, the outer coil set 146 is connected to a signal detection unit for detecting external vibration, and the inner coil set 144 is connected to a control unit for applying a control signal to control the response, such as the sensitivity and/or frequency response, of the geophone to external vibration.

Although in above embodiments, the cap 104, the cylindrical wall 108 and the base 106 are coupled using a crimping structure, in an alternative embodiment, the cylindrical wall 108 may be coupled to the cap 104 and the base 106 using other suitable fastening method and/or fasteners such as threads, clips, screws, flanges, nuts and bolts, glue, or the like.

In yet another embodiment, the upper magnetic boot 122, the magnetic block 124 and the lower magnetic boot 126 may be coupled using other suitable fastening method and/or fasteners such as threads, clips, screws, flanges, nuts and bolts, glue, or the like.

As skilled persons in the art appreciate, the upper magnetic boot 122, the magnetic block 124 and the lower magnetic block 126 may alternatively be made of other magnetic and/or ferromagnetic materials, or be electromagnetic structures suitable for forming a generally uniform and stable, circular magnetic field within the housing 102.

Although in above embodiments the geophone 100 comprises a magnetic structure 120 fixed in the housing 102 and a coil structure 140 axially movable in the housing 102, in an alternative embodiment, the geophone 100 comprises a coil structure 140 fixed in the housing 102 and a magnetic structure 120 axially movable in the housing 102. Similarly, the coil structure 140 comprises two sets of overlapped coils, including an inner coil set 144 wound on a bobbin 142 and an outer coil set 146 wound over the inner coil set 144.

Although in above embodiments the housing 102 comprises a cap 104, a cylindrical wall 102 and a base 106, in an alternative embodiment, the housing 102 is an integrated structure made of a suitable ferromagnetic material.

Although in above embodiments, the housing 102 generally has a cylindrical shape, in an alternative embodiment, the housing 102 may be of another suitable shape, e.g., a cuboid shape. Similarly, the magnetic structure 120 and/or the coil structure 140 may alternatively have other suitable shapes including a rectangular cross-section.

In an alternative embodiment, each of the two coil sets 144 and 146 may only comprise a single portion of coil positioned only at one end of the magnetic structure 120.

Figure 11:
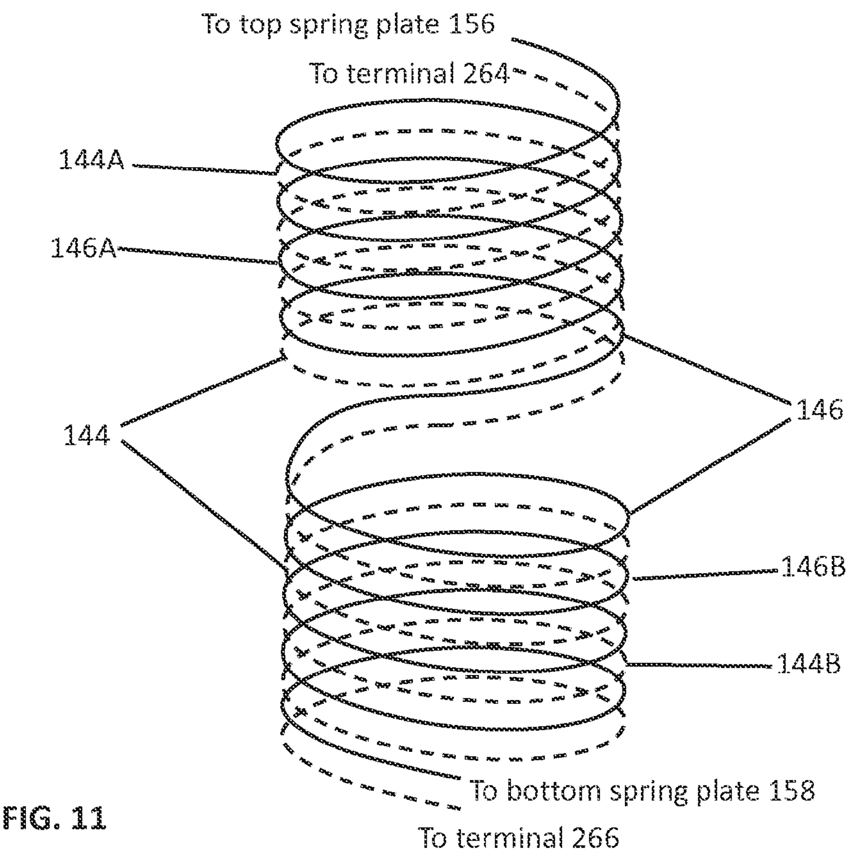
FIG. 11 is a simplified three-dimensional illustration of the coil sets of the movable coil structure of FIG. 7, according to an alternative embodiment.

FIG. 11 shows a simplified three-dimensional illustration of the two coil sets 144 and 146 of the movable coil structure 140, according to an alternative embodiment. In this embodiment, the two coil sets 144 and 146 are wound on the bobbin (not shown) simultaneously, forming an intermingled coil configuration. The two coil sets 144 and 146 are therefore overlapped in space as they occupy the same space. Depending on implementation, one of the coil sets 144 and 146 may be used for vibration detection, and the other of the coil sets 144 and 146 may be used for controlling. As shown in FIG. 11, each winding of the coil set 144 may alternate with each winding of the coil set 146. Other embodiments are also readily available. For example, one coil set winding may alternate every second or a greater number of winding of the other coil set.

One of the advantages of having intermingled coil sets 144 and 146 is that the intermingled coil sets 144 and 146 can be wound to the bobbin 142 simultaneously using existing winding equipment (or with slight modification to the existing winding equipment). As the coil sets 144 and 146 are wound in parallel, the geophone manufacturing time may be reduced.

Other configurations of coil sets are also readily available in various embodiments, all of which result in effective coil sets extending along the entirety of the magnetic field. For example, the coil structure 140 may comprise more than two coil sets. The multiple coil sets may be wound one over another, in parallel, or a combination thereof such that some coil sets are wound in parallel, and some other coil sets are wound over other coil sets. FIGS. 12A to 12E show some examples of coil set configuration. The coil set configuration in above embodiments is also shown for the purpose of comparison. In these figures, symbol "X" represents the winding direction downwardly normal to the paper, and symbol "O" represents the winding direction upwardly normal to the paper. Each coil set comprises an upper portion (denoted with suffix "A" in figures) and a lower portion (denoted with suffix "B" in figures) winding in opposite directions, and each portion may comprise one or more turns of coil, depending on the implementation.

Figure 12A:
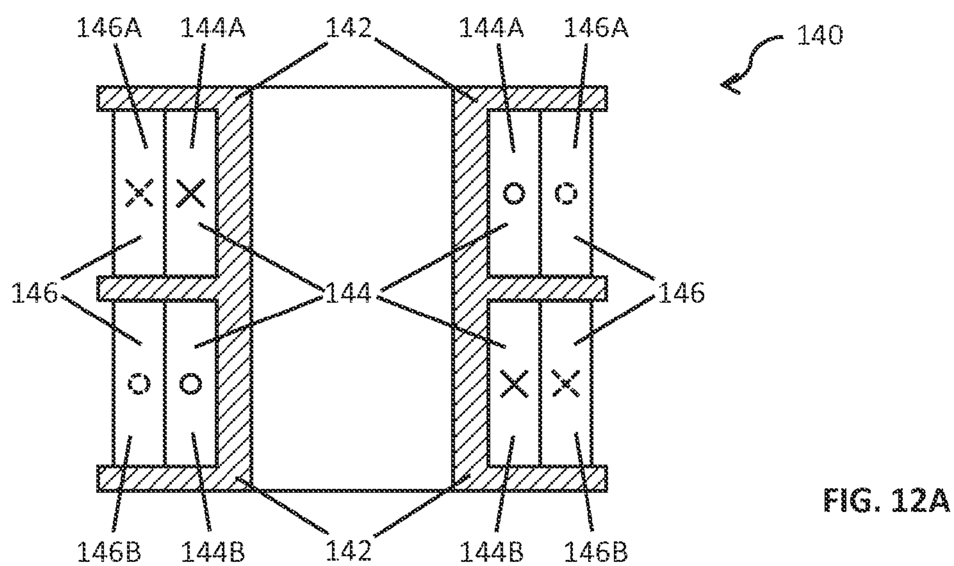
FIGS. 12A to 12G are schematic diagrams of coil set configuration of the movable coil structure of FIG. 7, according to various alternative embodiments.

FIG. 12A shows the coil set configuration of FIG. 9, in which the coil structure 140 comprises an inner coil set 144 wound on the bobbin 142, and an outer coil set 146 wound over the inner coil set 144. In this example, the winding direction of each portion 144A, 1443 of the coil set 144 is the same as that of the corresponding portion 146A, 146B of the coil set 146.

Figure 12B:
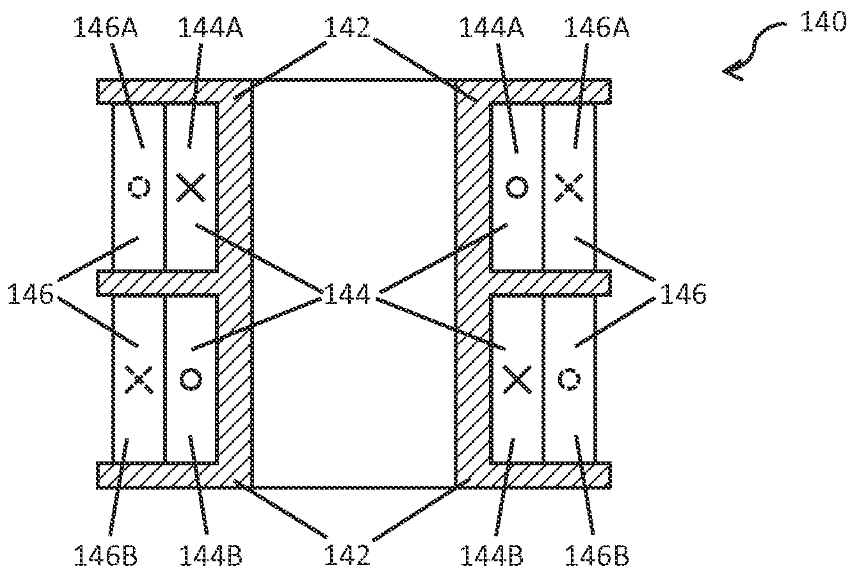

FIG. 12B shows the coil set configuration according to an alternative embodiment, in which the coil structure 140 comprises an inner coil set 144 wound on the bobbin 142, and an outer coil set 146 wound over the inner coil set 144. In this example, the winding direction of each portion of the coil set 144 is opposite to that of the corresponding portion of the coil set 146.

Figure 12C:
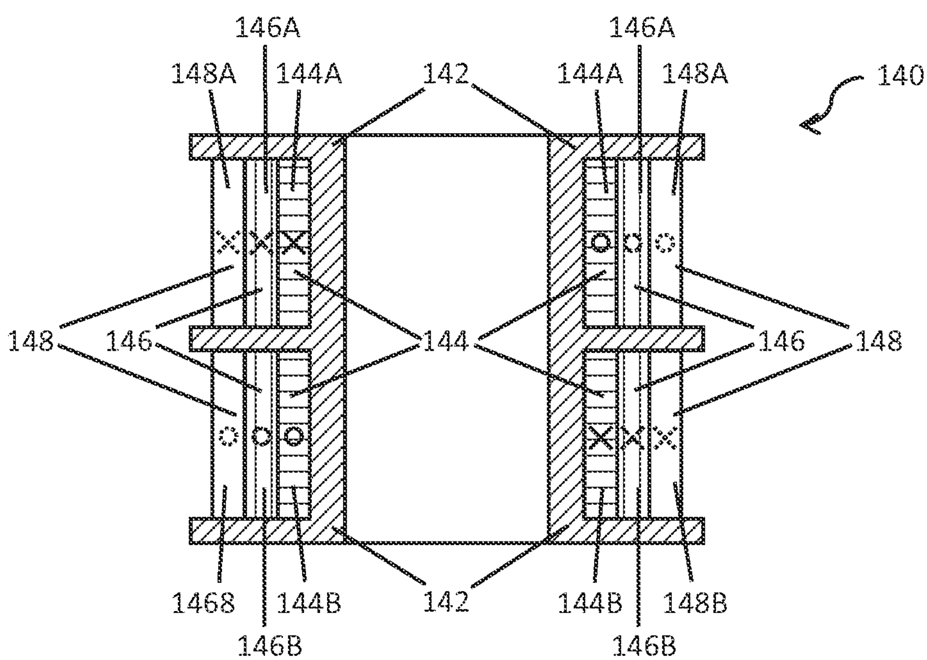

FIG. 12C shows the coil set configuration according to another embodiment, in which the coil structure 140 comprises three coil sets 144, 146 and 148 where the coil set 144 is wound on the bobbin 142, the coil set 146 is wound over the coil set 144, and the coil set 148 is wound over the coil set 146. In this example, the winding directions of corresponding portions of the coil sets 144, 146 and 148 are the same.

Figure 12D:
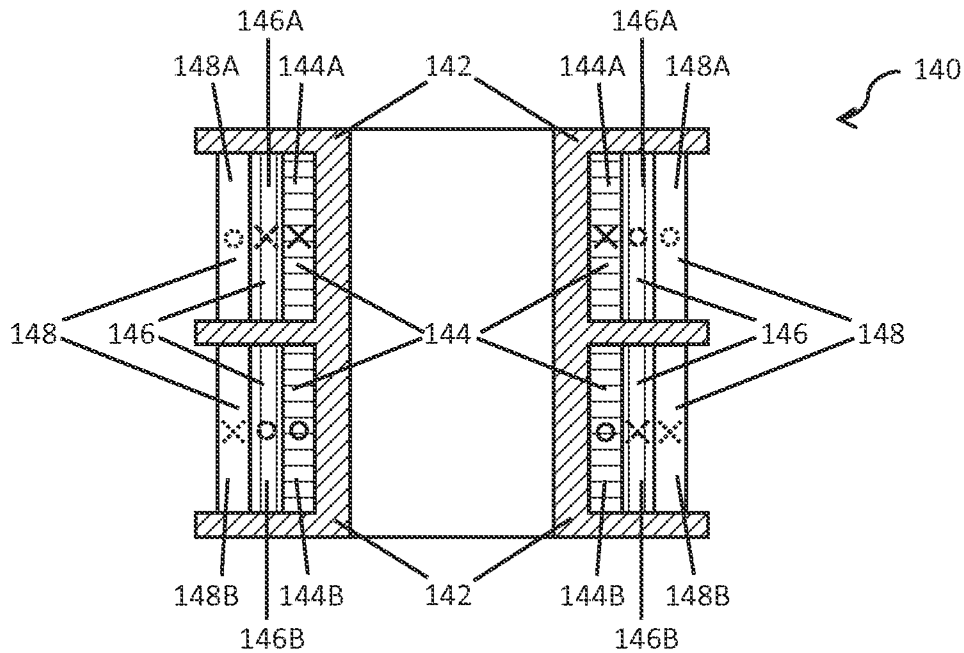

FIG. 12D shows the coil set configuration according to yet another embodiment, in which the coil structure 140 comprises three coil sets 144, 146 and 148 where the coil set 144 is wound on the bobbin 142, the coil set 146 is wound over the coil set 144, and the coil set 148 is wound over the coil set 146. In this example, the winding directions of corresponding portions of the coil sets 144 and 146 are the same. However, the winding direction of each portion of the coil set 148 is opposite to the corresponding portions of the coil sets 144 and 146.

Figure 12E:
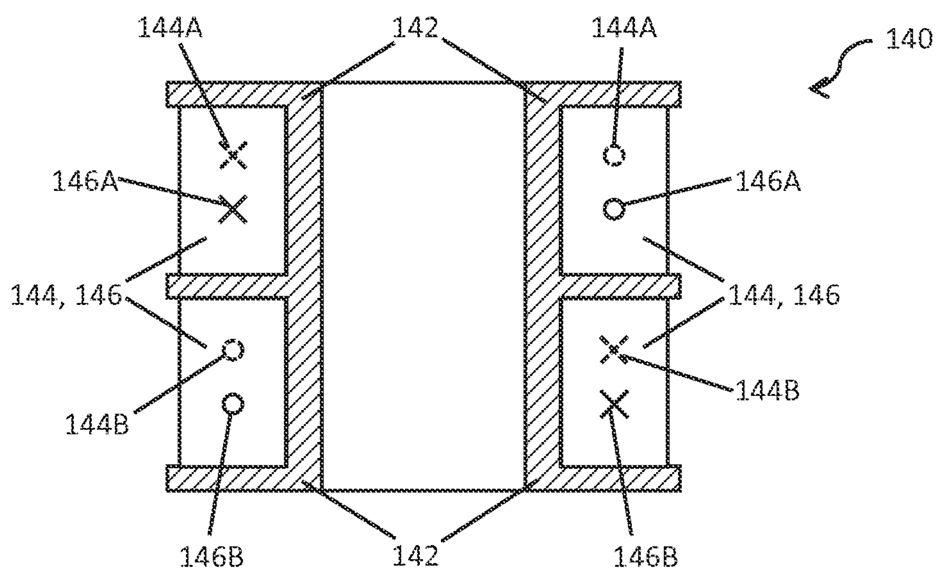

FIG. 12E shows the coil set configuration of FIG. 11, in which the coil structure 140 comprises two intermingled coil sets 144 and 146 wound on the bobbin 142 in parallel. In this example, the winding direction of each portion of the coil set 144 is the same as that of the corresponding portion of the coil set 146.

Figure 12F:
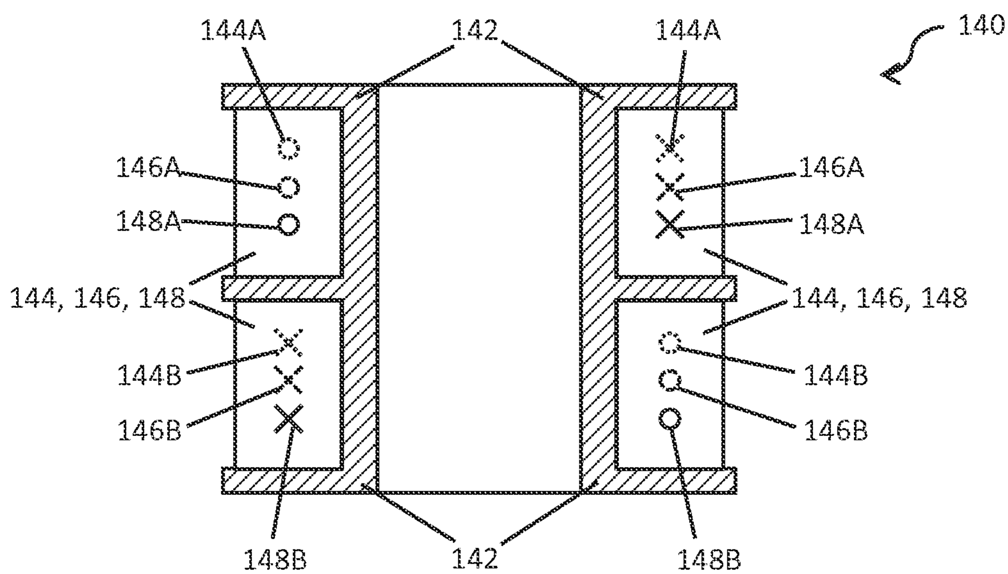

FIG. 12F shows the coil set configuration according to still another embodiment, in which the coil structure 140 comprises three intermingled coil sets 144, 146 and 148 wound on the bobbin 142 in parallel. In this example, the winding directions of corresponding portions of the coil sets 144, 146 and 148 are the same.

Figure 12G:
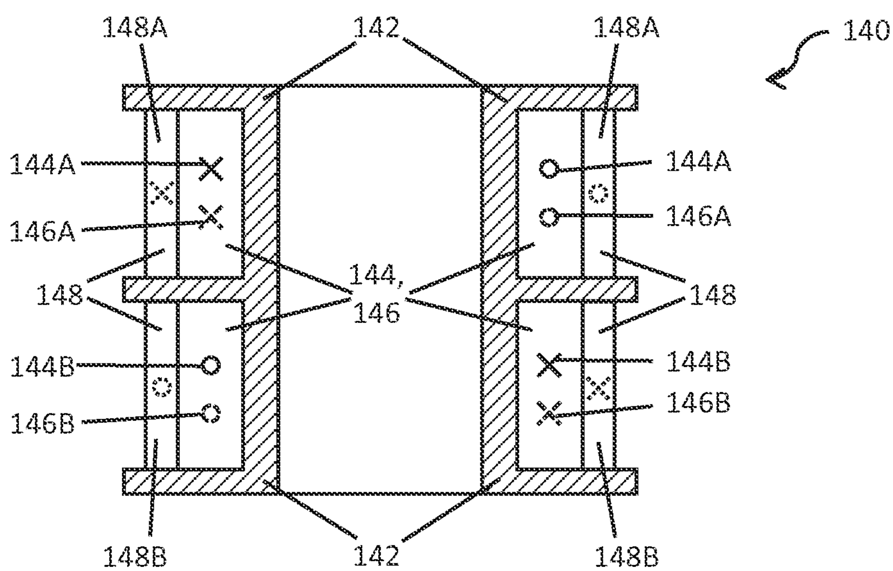

FIG. 12G shows the coil set configuration according to yet still another embodiment, in which the coil structure 140 comprises two intermingled coil sets 144 and 146 wound on the bobbin 142 in parallel, and a third coil set 148 wound over the intermingled coil sets 144 and 146. In this example, the winding directions of corresponding portions of the coil sets 144, 146 and 148 are the same.

Those skilled in the art appreciate, with the help of above-described examples, that the coil structure may comprise a plurality of coil sets wound intermingled or one within another. Some coil sets may be wound in the same direction, and some other coil sets may be wound in opposite directions. In some alternative embodiments, intermingled coil sets may be wound in opposite directions.

One or more coil sets may be used for vibration detection. One or more other coil sets may be used for controlling the response of the geophone. The geophone disclosed herein involves a plurality of mechanical and electrical signals, including input signals such as vibration and the control sign for controlling the response of the geophone, output signals such as the voltage output bearing the information of vibration, and internal signals such as the voltage output generated on each vibration detection coil set(s), the combination of which forms the output signal of the geophone, and the control force generated by the control coil set(s). Generally, the input signals determine the magnitude and phase of the internal and output signals. However, for a given input signal, the winding direction of the coil set that the input signal applies thereto also determines the phase of the relevant internal and output signals. In a simplified explanation of the scientific theory of the geophone, FIGS. 13A to 15B illustrates the relationship between the coil winding direction and the phase of input, internal and output signals.

As is well known to those skilled in the art, when the coil structure 140 is moving with respect to the magnetic structure 120, electrical voltage is generated in the coil structure 140. According to Faraday's Law, the voltage can be calculated as:

$$E=B\times L\times V=S\times V$$

where bold-font symbols represent vector variables, "x" represents vector cross-production, E represents the voltage across the coil winding in the coil structure 140, B represents the magnetic field of the magnetic structure 120, V represents the velocity of the coil structure 140 with respect to the magnetic structure 120, L represents the length of the coil winding, and S=B L. Conventionally in open-loop geophones, ||S|| is known as the sensitivity of the geophone. The generated voltage E on the coil set may be detected by a signal-processing circuit or device for measuring vibration.

The magnitude of the voltage E is generally proportional to the velocity of the coil structure 150 relative to the magnetic structure 120 as the magnetic flux density of the magnetic field B around the coil structure 140 is substantially constant. The direction of generated voltage E in a coil set is determined by the winding direction of the coil. FIGS. 13A to 14B compare the directions of generated voltage E, respectively, in a first coil set 502 and in a second coil set 542 having a winding direction opposite to that of the first coil set 502.

Figure 13A:
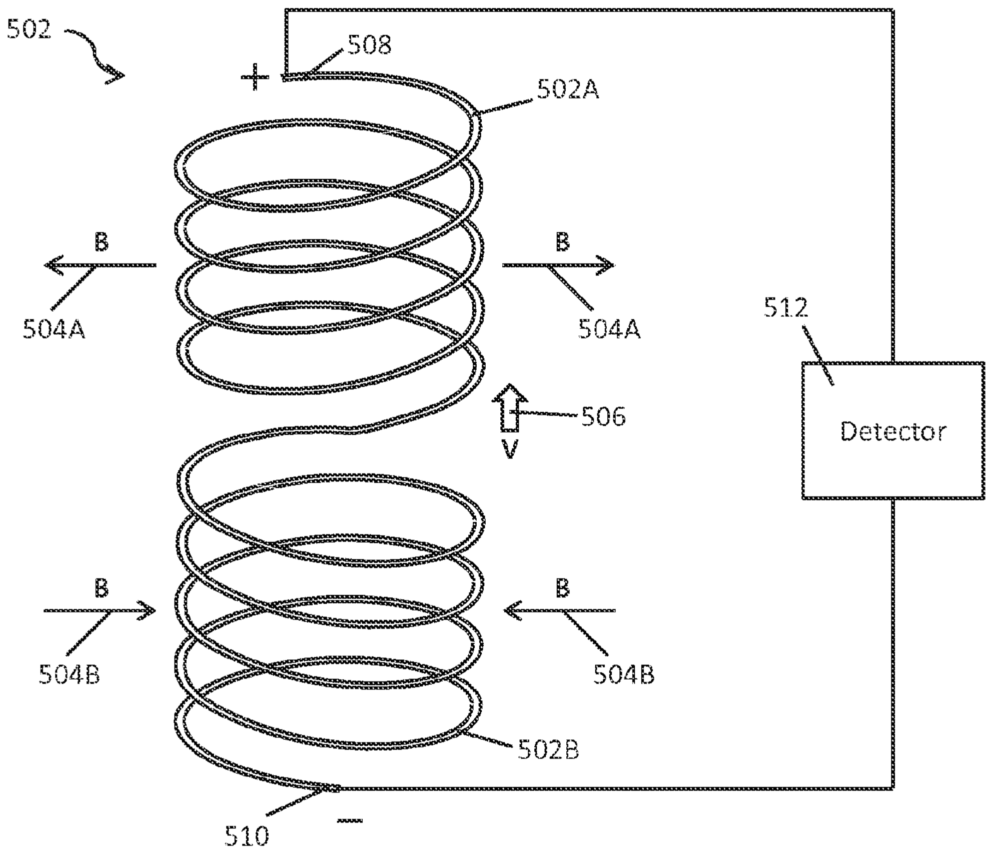
FIGS. 13A to 14B show the relationship between the direction of the voltage generated in a coil set and the winding direction thereof.
Figure 13B:
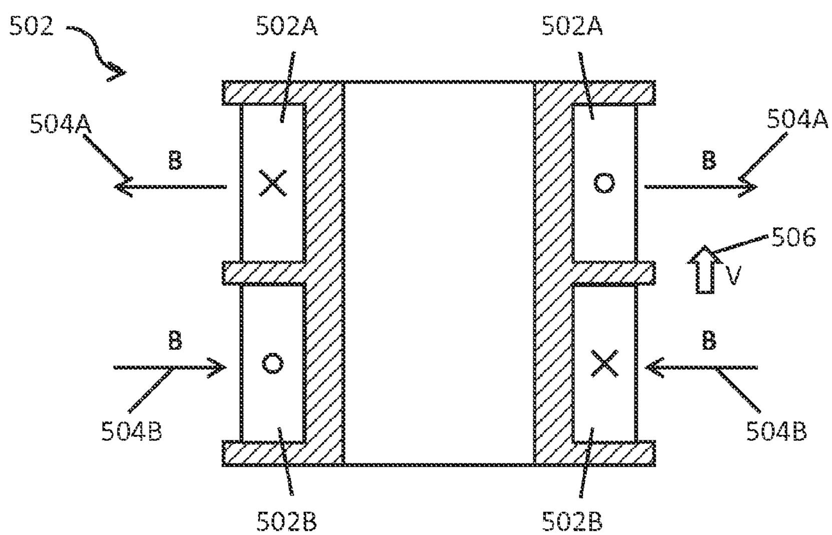

FIGS. 13A and 13B show the first coil set 502 positioned in a magnetic field B formed by a magnetic structure (not shown) as described above. The magnetic flux of the upper portion of the magnetic field B extends radially outwardly from the inside of the coil 502, as indicated by the arrow 504A, and the magnetic flux of the lower portion of the magnetic field B extends radially inwardly into the coil 502, as indicated by the arrow 504B.

The coil set 502, as described above, comprises an upper portion 502A and a lower portion 502B positioned in the upper and lower portions 504A and 504B of the magnetic field B, respectively. The winding direction of the upper portion 502A of the coil set 502 is clockwise, and the winding direction of the lower portion 502B of the coil set 502 is counter-clockwise, when viewed from top of the coil set 502.

When external vibration causes the coil set 502 to move axially upward, as indicated by the arrow 506, in the magnetic field B, an electrical voltage E is generated with a direction such that the top end 508 of the coil set 502 has a higher electrical potential than the bottom end 510 of the coil set 502, as indicated by the "+" and "−" signs, respectively. A detector 512 may be electrically connected to the coil set 502 to detect the voltage between the top end 508 and the bottom end 510.

Similarly, when the coil set 502 is moving downwardly in the magnetic field B, an electrical voltage E is generated with a direction such that the top end 508 of the coil set 502 has a lower electrical potential than the bottom end 510 of the coil set 502. In the geophone 100, the coil sets of the coil structure 140 are vibrating axially, i.e., alternatively moving axially upwardly and downwardly. The detector 512 then receives an alternating voltage signal.

Figure 14A:
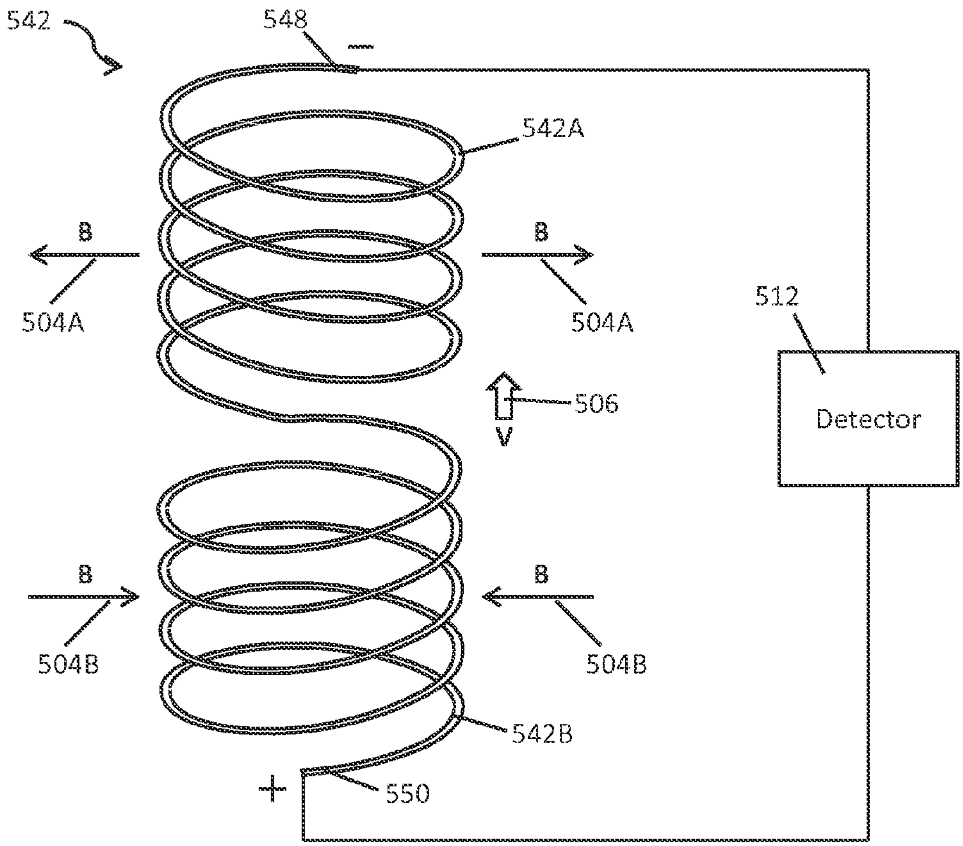
Figure 14B:
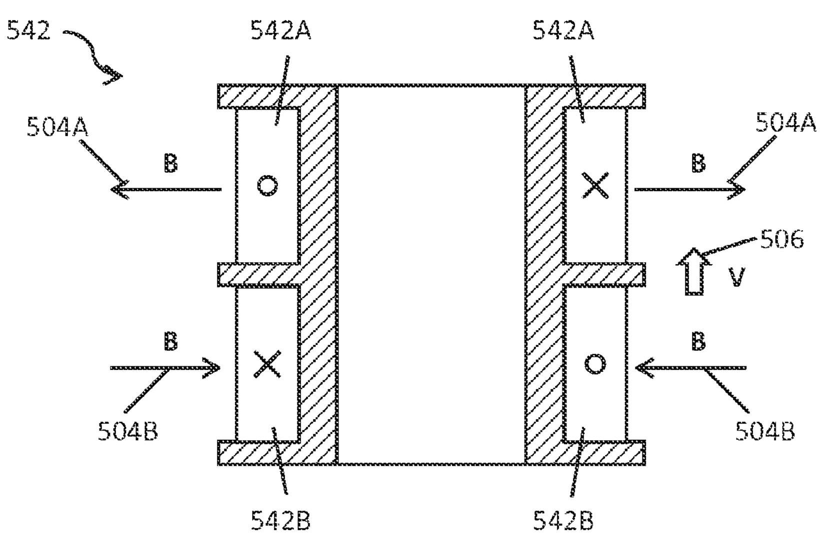

FIGS. 14A and 14B show the second coil set 542 positioned in a magnetic field B formed by a magnetic structure (not shown). The difference between FIGS. 14A, 14B and 13A, 13B is that the second coil set 542 has a winding direction opposite to that of the first coil set 542, i.e., the winding direction of the upper portion 542A of the coil set 542 is counter-clockwise, and the winding direction of the lower portion 542B of the coil set 542 is clockwise, when viewed from top of the coil set 542.

When external vibration causes the coil set 542 to move axially upwardly as indicated by the arrow 506, in the magnetic field B, an electrical voltage E is generated such that the top end 548 of the coil set 542 has a lower electrical potential than the bottom end 550 of the coil set 542, as indicated by the "+" and "−" signs, respectively.

Similarly, when the coil set 542 is moving axially downwardly in the magnetic field B, an electrical voltage E is generated with a direction such that the top end 548 of the coil set 542 has a higher electrical potential than the bottom end 550 of the coil set 542. In the geophone 100, the coil sets of the coil structure 140 is vibrating axially, i.e., alternatively moving upwardly and downwardly. The detector 512 then receives an alternating voltage signal.

Comparing the coil sets 502 and 542, it can be seen that, when moving in the same magnetic field B, coil sets with opposite winding directions generate antiphase voltage signals, i.e., voltage signals having a 180° phase difference therebetween, and coil sets with same winding direction generate in phase voltage signals, i.e., voltage signals having 0° phase difference.

As described above, one or more coil sets may be used for controlling the response of the geophone 100. According to Lorentz's law, when an electrical current passes through a coil in a magnetic field, a mechanical force is applied to the coil, which may be expressed as:

$$F=I\times L\times B=I\times S$$

Where F represents the mechanical force applied to the coil, and I represents the current in the coil applied by a controller, such as a control circuit, component or device.

Based on this theory, an electrical current may be applied to a coil set to cause a mechanical force F applied to the coil structure 140. When the generated mechanical force F and the moving direction of the coil structure 140 are in phase, i.e., at the same direction, the mechanical force F enhances the vibration of the coil structure 140. When the generated mechanical force F and the moving direction of the coil structure 140 are antiphase, i.e., at opposite directions, the mechanical force F impedes the vibration of the coil structure 140. As the mechanical force F, including its direction and magnitude, is a function of the current I, one may carefully design the current I, which may be a function of external vibration, to compensate for or counteract the vibration force applied to the coil structure 140 for improving the response of the geophone 100.

Figure 15A:
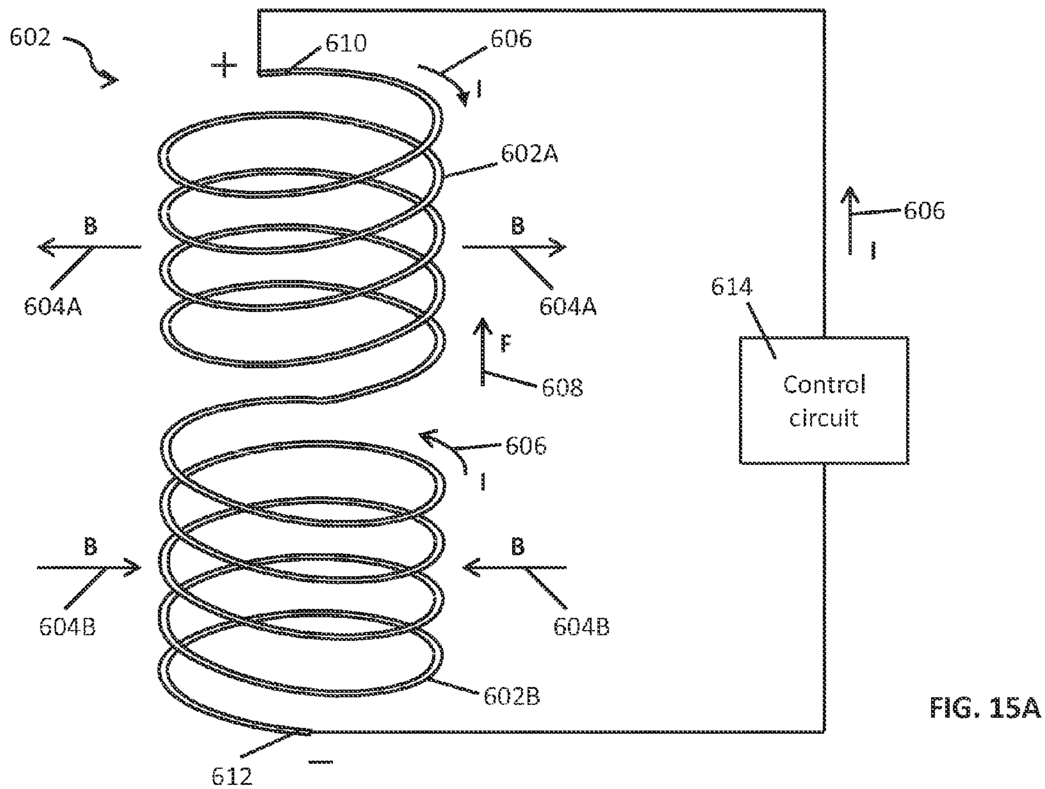
Figure 15B:
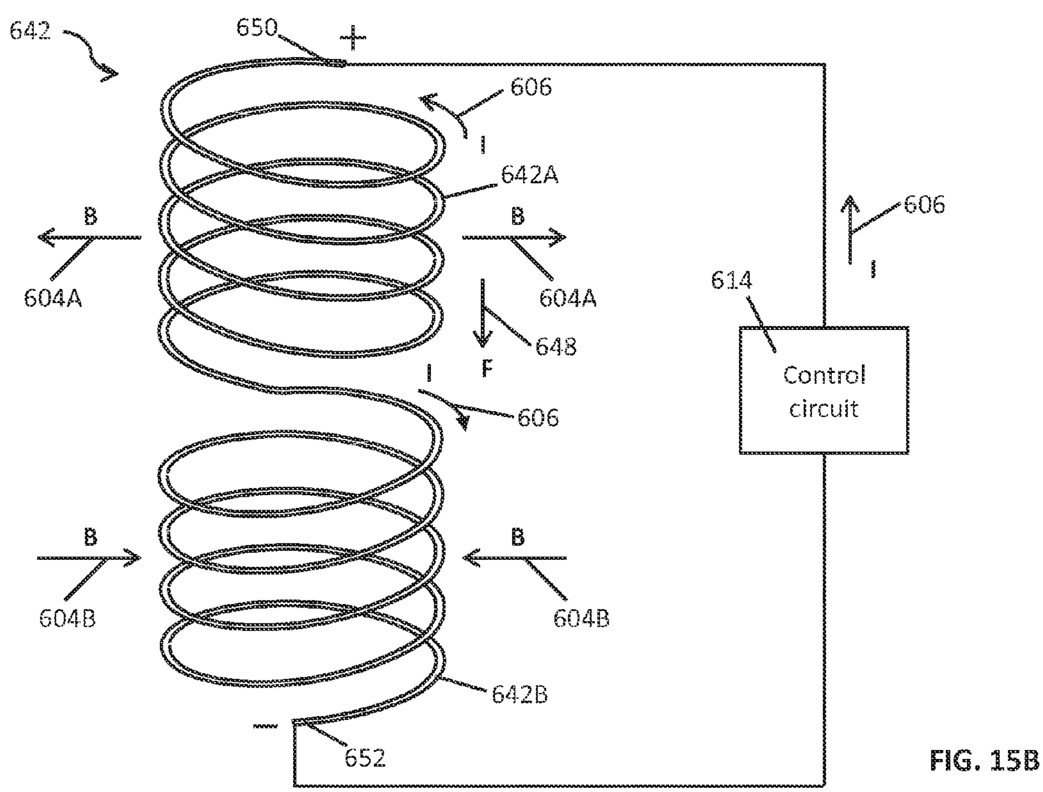

The direction of the generated mechanical force F is also determined by the winding direction of the coil set. FIGS. 15A and 15B compare the directions of mechanical force F, respectively, in a first coil set 602 and in a second coil set 642 having a winding direction opposite to that of the first coil set 602.

FIG. 15A shows the first coil set 602 positioned in a magnetic field B formed by a magnetic structure (not shown) as described above. The magnetic flux of the upper portion of the magnetic field B extends horizontally outwardly from the inside of the coil 602, as indicated by the arrow 604A, and the magnetic flux of the lower portion of the magnetic field B extends horizontally inwardly into the coil 602, as indicated by the arrow 604B.

The coil set 602 comprises an upper portion 602A and a lower portion 602B positioned in the upper and lower portions 604A and 604B of the magnetic field B, respectively. The winding direction of the upper portion 602A of the coil set 602 is clockwise, and the winding direction of the lower portion 602B of the coil set 602 is counter-clockwise, when viewed from top of the coil set 602.

A control device 614 is connected to the top and bottom ends 610 and 612 of the coil set 602, and applies an electrical current I to the coil set 602 with a direction flowing from the top end 610 to the bottom end 612, as indicated by the arrow 606. The applied current I in the magnetic field B causes an upward mechanical force F, as indicated by the arrow 608, applied to the coil set 602.

In contrary, in FIG. 15B, the coil set 642 is wound in a direction opposite to that of the coil set 602 in FIG. 15A, i.e., the winding direction of the upper portion 642A of the coil set 642 is counter-clockwise, and the winding direction of the lower portion 642B of the coil set 642 is clockwise, when viewed from top of the coil set 602.

A control device 614 is connected to the top and bottom ends 650 and 652 of the coil set 642, and applies an electrical current I to the coil set 642 with a direction as indicated by the arrow 606, which causes a higher electrical potential at the bottom end 652 than at the top end 650, as indicated by the "+" and "−" signs, respectively. The applied current I in the magnetic field B causes a downward mechanical force F, as indicated by the arrow 648, applied to the coil set 642.

By comparing coil sets 602 and 642, it can be seen that, if two coil sets with opposite winding directions are connected to the same controller to receive the same control signal, the two coil sets generate antiphase mechanical forces. On the other hand, if two coil sets with the same winding direction are connected to the same controller to receive the same control signal, the two coil sets generate in phase mechanical forces.

Now referring to FIGS. 13A and 15A, it can be seen that, if a control signal applied to coil set 602 is in phase with the vibration detection signal output from coils set 502, the control signal gives rise to a mechanical force in phase with vibration, i.e., the generated mechanical force would strengthen the vibration of the coil structure.

Further referring to FIGS. 13A and 15B, it can be seen that, if a control signal applied to coil set 602 is antiphase with the vibration detection signal output from coils set 502, the control signal gives rise to a mechanical force antiphase with vibration.

Figure 16:
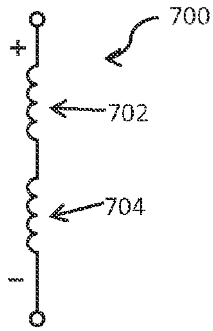
FIG. 16 shows a symbol for representing a coil set in electrical diagrams.

FIG. 16 shows a coil set symbol 700 that will be used in electrical diagrams hereinafter. The coil set symbol 700 consists of two vertically connected inductor symbols 702 and 704 with circles at the respective ends of the coil set symbol 700 representing electrical terminals. The coil set symbol 700 is also marked with a "+" and a "−" sign at the respective ends thereof. The "−" sign represents the reference terminal, and the "+" represents the signal terminal. Therefore, when two coil sets are used for vibration detection, the output signal measured at the signal terminals, with reference to the respective reference terminals, are in phase. On the other hand, when a coil set is used for controlling the response of the geophone, a control signal having a positive voltage applied at the signal terminal, with reference to the reference terminal, gives rise to an internal control force in phase with the vibration.

The mapping of the signal and reference terminals to the top and bottom ends of the physical coil set is determined by the winding direction of the physical coil set. For example, in one mapping scenario, the signal and reference terminals, respectively, correspond to the top and bottom ends of the physical coil set if the coil set is wound clockwise when viewed from top (see FIGS. 13A and 15A); and the signal and reference terminals, respectively, correspond to the bottom and top ends of the physical coil set if the coil set is wound counter-clockwise when viewed from top (see FIGS. 14A and 15B).

Figure 17A:
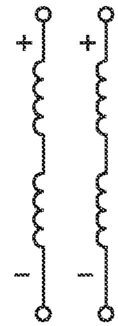
FIGS. 17A to 17N are schematic diagrams of coil set interconnection schemes of the movable coil structure of FIG. 7, according to various alternative embodiments.

In various embodiments, each coil set may be connected to a set of electrical terminals on the housing for connecting to external electrical circuits or devices for detecting vibration or applying control signals. Alternatively, some coil sets may be connected or combined during manufacturing of the geophone 100, and each combined coil sets are connected to a set of electrical terminals on the housing for connecting to external electrical circuits or devices. FIGS. 17A to 17N are electrical diagrams showing examples of combining coil sets in a geophone 100 according to various embodiments.

In FIGS. 17A to 17N, the graphical positions of the coil set symbols do not necessarily directly match the physical positions thereof. For example, coil sets appearing adjacent to each other in these figures, e.g., coil sets 742 and 744 in FIG. 17G, does not necessarily mean or imply that they are physically adjacent or intermingled in the coil structure 140 of the geophone 100.

Figure 17B:
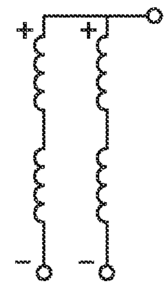

FIGS. 17A and 17B show example diagrams for a geophone 100 having two coil sets. In FIG. 17A, each coil set is connected to a pair of terminals, and the two coil sets are not connected. The geophone 100 then comprises four terminals on its housing, as shown in FIG. 1.

Figure 18A:
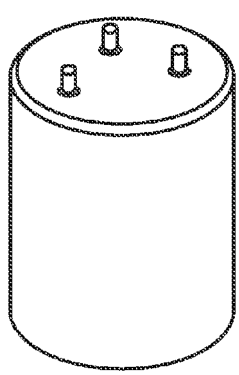
FIGS. 18A to 18C are perspective views of a multi-coil, multi-terminal geophone, according to various alternative embodiments.

In FIG. 17B, the two coil sets are electrically connected at one end, which is then connected to a terminal. The other end of each coil set is connected to a respective terminal. The geophone 100 then comprises three terminals on its housing, as shown in FIG. 18A.

Figure 17C:
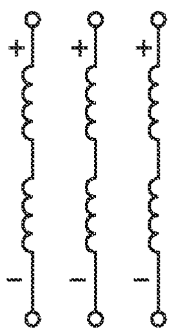

FIGS. 17C to 17H are example diagrams for a geophone 100 having three coil sets. In FIG. 17C, each coil set is connected to a pair of terminals, and the three coil sets are not connected. The geophone 100 then comprises six terminals on its housing, as shown in FIG. 18C.

Figure 17D:
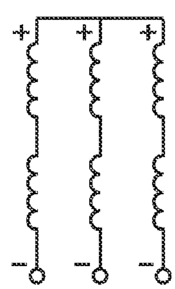

In FIG. 17D, the three coil sets are electrically connected together at one end, the common lead of which, however, is not connected to any terminal. The other end of each coil set is connected to a respective terminal. The geophone 100 then comprises three terminals on its housing, the perspective view of which may be the same as FIG. 18A.

Figure 17E:
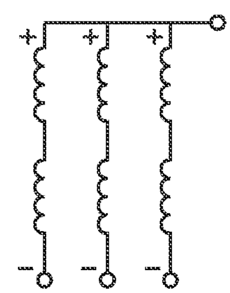

In FIG. 17E, the three coil sets are electrically connected at one end, which is then connected to a terminal. The other end of each coil set is connected to a respective terminal. The geophone 100 then comprises four terminals on its housing, the perspective view of which may be the same as FIG. 1.

Figure 17F:
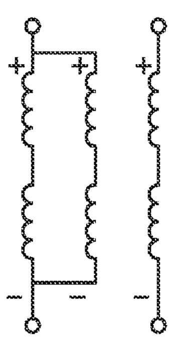

In FIG. 17F, two coil sets are electrically connected at both ends, each of which is then connected to a terminal, forming a parallel circuit. The other coil set is separately connected to a pair of terminals. The geophone 100 then comprises four terminals on its housing, the perspective view of which may be the same as FIG. 1.

Figure 17G:
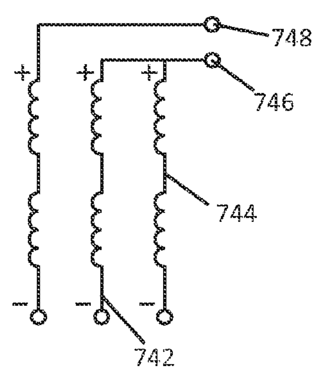
Figure 18B:
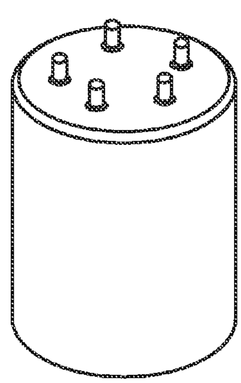
Figure 18C:
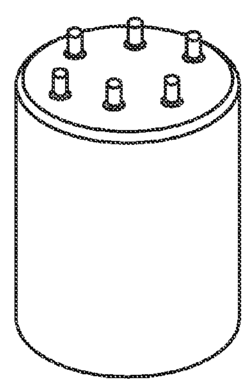

In the example of FIG. 17G, two coil sets are electrically connected at one end, which, is then connected to a terminal. The other ends of these two coil sets are each connected to a terminal. The third coil set is separately connected to a pair of terminals. The geophone 100 then comprises five terminals on its housing, as shown in FIG. 18B.

Figure 17H:
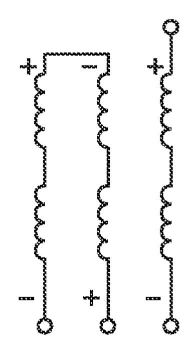
Figure 17I:
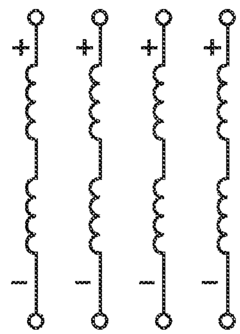
Figure 17J:
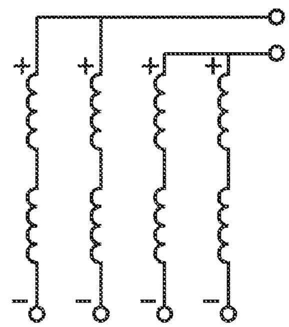
Figure 17K:
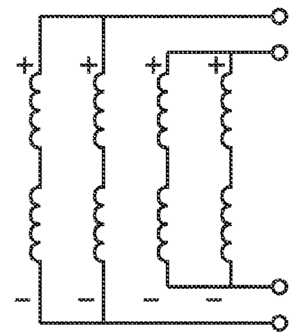
Figure 17L:
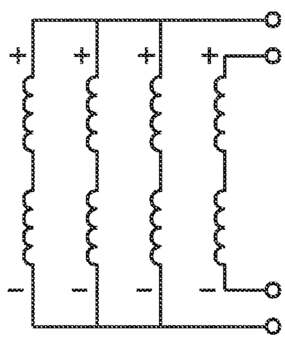
Figure 17M:
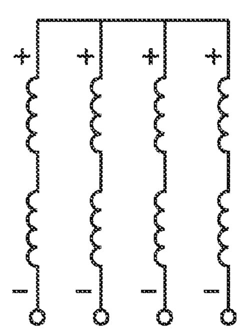
Figure 17N:
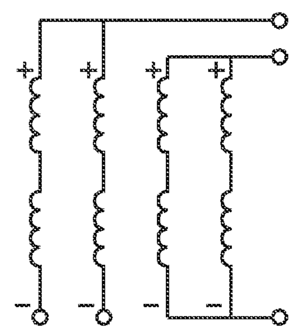

In the example of FIG. 17H, two coil sets are electrically connected at one end, which, however, is not connected to any terminal. The other ends of these two coil sets are each connected to a terminal. The third coil set is separately connected to a pair of terminals. The geophone 100 then comprises four terminals on its housing, the perspective view of which may be the same as FIG. 1.

FIGS. 17I to 17N are example diagrams for a geophone 100 having four coil sets. The detailed description of the coil set configuration is omitted as it is apparent to skilled reader with the help of above described FIGS. 17A to 17H.

In some alternative embodiments, some coil sets are connected at one end, which is then connected to the metal housing as a common electrical ground.

Figure 19A:
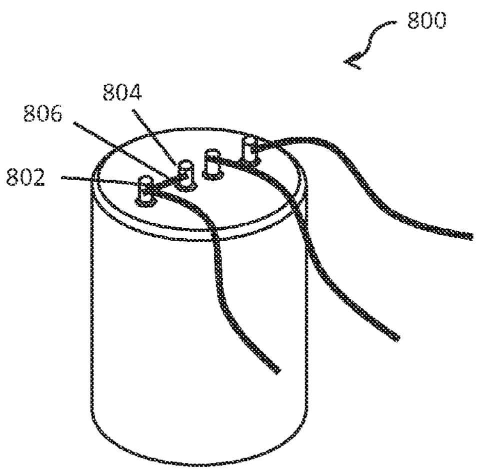
FIGS. 19A and 19B are perspective views of multi-coil, multi-terminal geophones with some electrical terminals thereof being connected by electrically conductive wires, according to various alternative embodiments.

Those skilled in the art appreciate that FIGS. 17A to 17N are examples only, and coil sets in a geophone 100 may be combined in other ways as needed. The coil sets may be combined inside the housing of the geophone as illustrated in FIGS. 17A to 17N. In some alternative embodiments, the coil sets may be combined outside the housing external electrical wiring for ultimate circuit flexibility. For example, FIG. 19A shows a geophone 800 having two coil sets and four-terminals as FIG. 17A, wherein the electrical terminals 802 and 804 correspond to the two "+" signed terminals, respectively, A user may combine the coil sets as in FIG. 17B by connecting electrical terminals 802 and 804 using an electrical wiring 806. External terminals for user-specified circuits enable great flexibility in the determination of geophone behavior without the need for a plethora of geophone models.

Figure 19B:
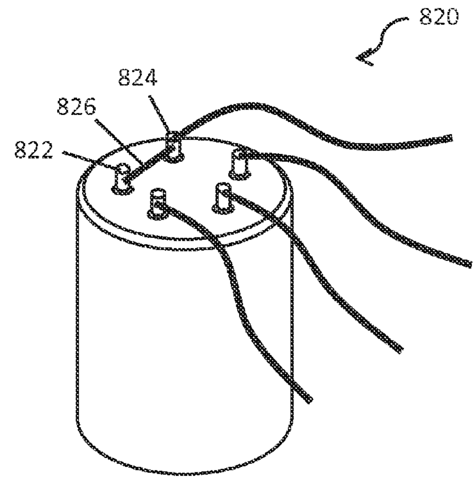

In yet some other embodiments, some coil sets are combined inside the housing of the geophone during manufacturing, and a user may further combine some coil sets outside the housing external electrical wiring. For example, FIG. 19B shows a geophone 820 having three coil sets configured as FIG. 17G, wherein the electrical terminals 822 and 824 correspond to the terminals 746 and 748 in FIG. 17G, respectively. A user may further combine the coil sets as in FIG. 17E by connecting electrical terminals 822 and 824 using an electrical wiring 826.

In an alternative embodiment, the electrical terminals are marked to indicate the phase relationship between the signals of different coil sets, including output voltage signal, input control signal and/or the mechanical control force caused by the input control signal.

Figure 20A:
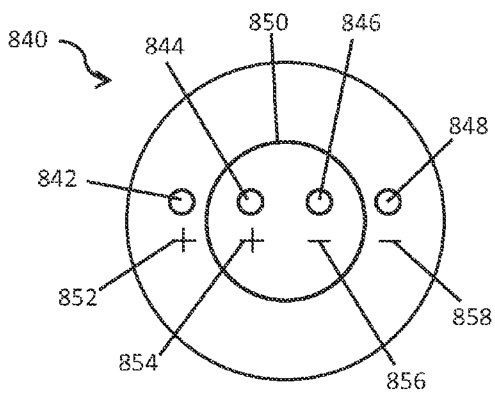
FIG. 20A is a top plan view of a multi-coil, multi-terminal geophone having marks on the housing thereof for indicating the grouping and phase relationship of the electrical terminals thereof, according to another embodiment.

For example, FIG. 20A shows a top view of a geophone 840 having two coil sets and four electrical terminals 842 to 848. Each coil set is connected to a pair of electrical terminals. The four terminals are marked by a circle 850 drawn or otherwise engraved on the cap of the geophone 840, and by a "+" or "–" symbol adjacent thereto. The circle 850 indicates that the terminals 844 and 846 enclosed therein are connected to the same coil set, and the other two terminals 842 and 846 are connected to the other coil set.

Terminals 842 and 844 are each marked with a "+" sign, and terminals 846 and 848 are each marked with a "–" sign, indicating that signals output from terminals 842 and 844, with reference to respective terminals 846 and 848, are in phase when they are both used for detecting vibration, and that, when one pair of terminals are used for vibration detection and the other pair are used for controlling the response of the geophone, a control signal applied to the "+" signed terminal of the control coil set that is in phase with the vibration detection signal output from the "+" signed terminal of the vibration detection signal, with reference to the respective "–" signed terminals, gives rise to a mechanical control force in phase with vibration.

Figure 20B:
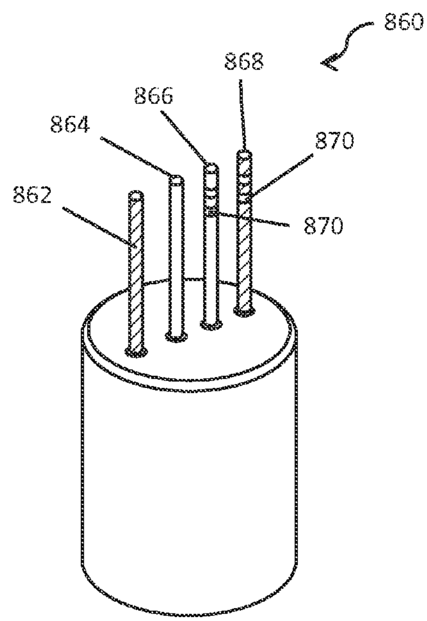
FIG. 20B is a top plan view of a multi-coil, multi-terminal geophone having marks on the electrical terminals thereof for indicating the grouping and phase relationship of the electrical terminals, according to another embodiment.

FIG. 20B illustrates a geophone 860 with marked electrical terminals 862 to 868 according to another embodiment. In this embodiment, the terminals 862 to 868 are marked using different colors and stripes, wherein terminals with the same color are connected to the same coil set, and terminals with the same number of stripes 870 are in phase.

The multi-coil, multi-terminal geophone disclosed herein allows users to customize the geophone to meet their requirement. FIGS. 21A to 23B show some examples of customizing a geophone 900 having three coil sets 922, 924 and 926, and six electrical terminals 902 to 912 on the housing thereof. The coil set 922 is connected to terminals 902 and 904, the coil set 924 is connected to terminals 906 and 908, and the coil set 926 is connected to terminals 910 and 912. The terminals 902 to 912 are marked by circles 932, 934 and 936 printed on the cap of the geophone 900 for indicating the terminal pairs and by colors for indicating phase relationship. The circle 932 encloses terminals 902 and 904, circle 934 encloses terminals 906 and 908, and circle 936 encloses terminals 910 and 912. Terminals 902, 906 and 910 have a first color and terminals 904, 908 and 912 have a second color, indicating that the ordered terminal pairs (902, 904), (906, 908) and (910, 912) are in phase.

Figure 21A:
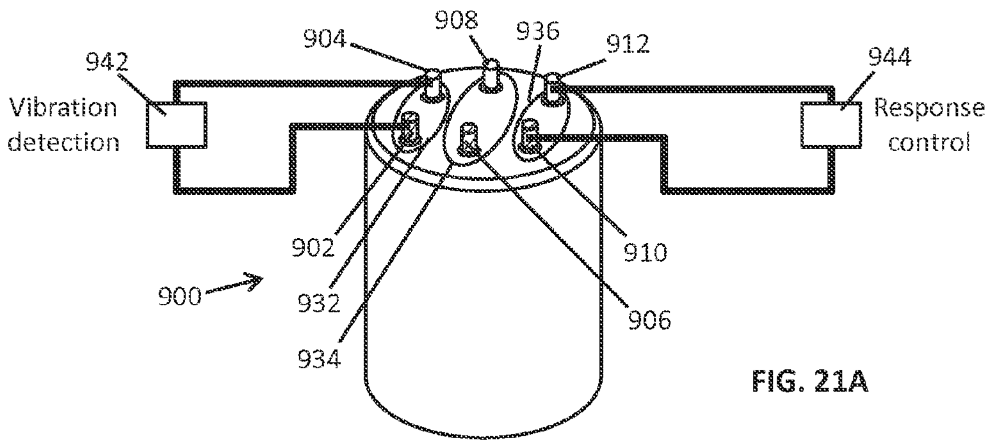
FIGS. 21A and 21B show a three-coil, six-terminal geophone with one coil set for vibration detection and another coil set for response controlling.
Figure 21B:
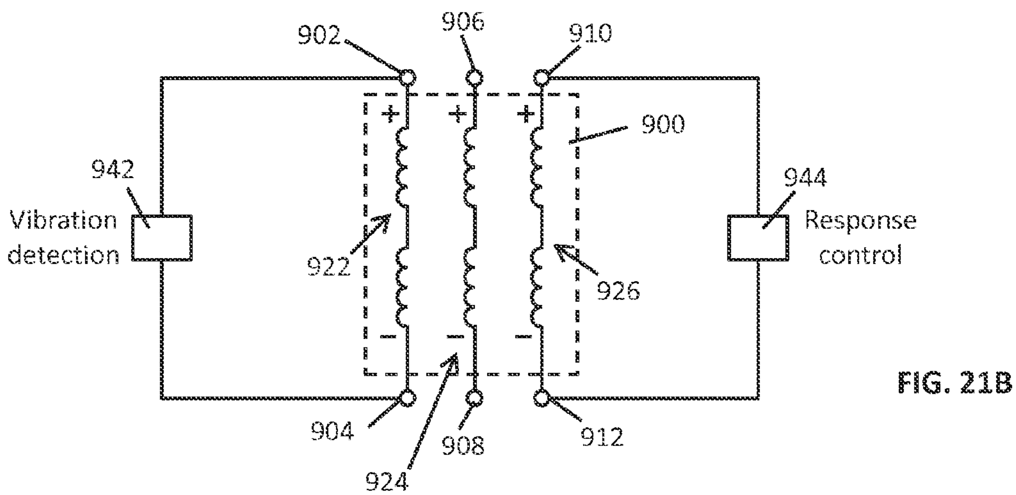

In FIGS. 21A and 21B, terminals 902 and 904 are connected to a vibration detection device 942 for detecting vibration from measuring the voltage output therefrom, and thus the coil set 922 is used as a vibration detection coil set. Terminals 910 and 912 are connected to a control device 944 for applying a control signal thereto to control the response of the geophone 900, and thus the coil set 926 is used as a control coil set. Terminals 906 and 908, and thus the coil set 924, are not used.

Figure 22A:
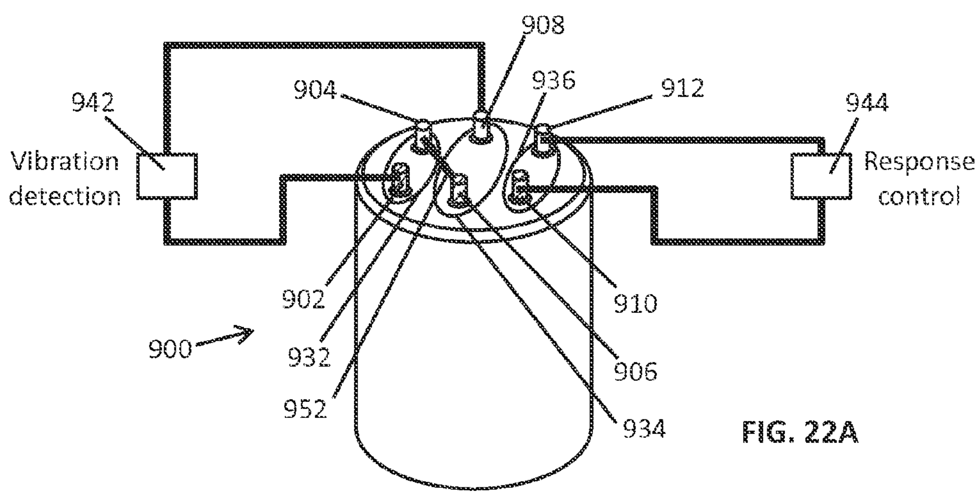
FIGS. 22A and 22B show a three-coil, six-terminal geophone with two coil sets interconnected for vibration detection and the other coil set for response controlling.
Figure 22B:
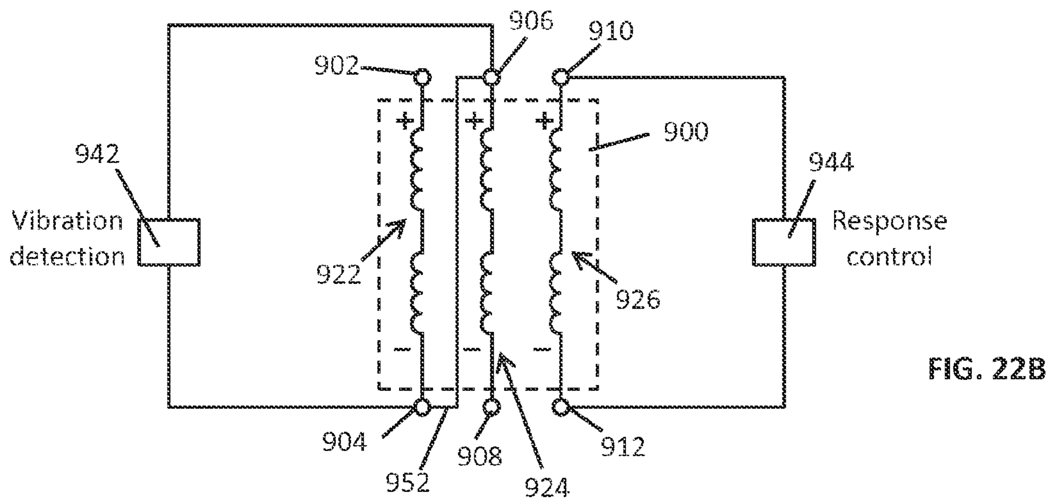

In FIGS. 22A and 228, terminals 904 and 906 are connected by an electrical wire 952. The vibration detection device 942 is connected to terminals 902 and 908. The control device 944 is connected to terminals 910 and 912. In this example, coil sets 922 and 924 are connected in mutual series for detecting vibration, and coil set 926 is used for controlling the response of the geophone 900.

Figure 23A:
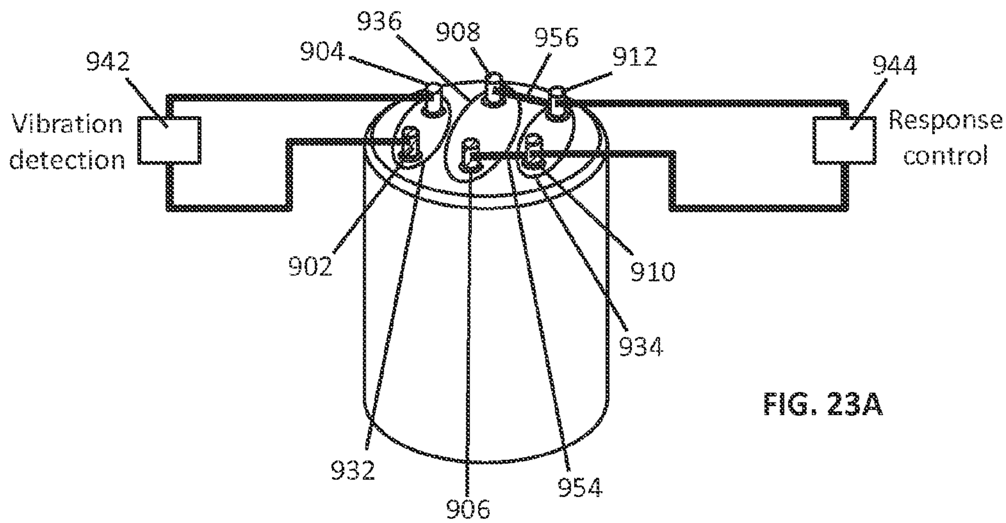
FIGS. 23A and 23B show a three-coil, six-terminal geophone with one coil set for vibration detection and the other two coil sets interconnected for response controlling.
Figure 23B:
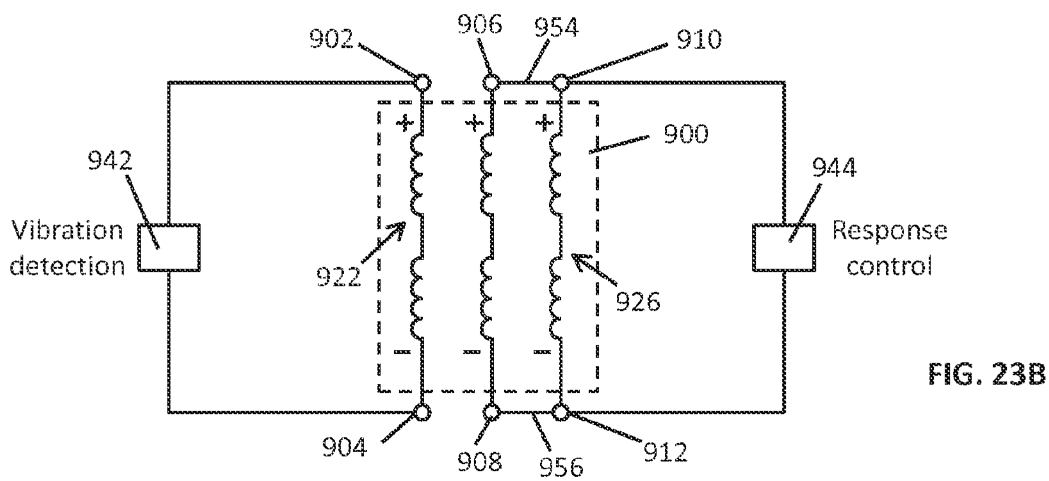

In FIGS. 23A and 23B, the vibration detection device 942 is connected to terminals 902 and 904. The control device 944 is connected to terminals 910 and 912, which are further connected to terminal 906 is and 908 by electrical wires 954 and 956, respectively. In this example, coil set 922 is used for detecting vibration. Coil sets 926 and 928 are connected in parallel for applying a control signal to control the response of the geophone 900.

The multi-coil, multi-terminal geophone disclosed herein therefore provides flexibility for users to combine the coil sets to make trade-offs between the geophone sensitivity and frequency response by varying the number of coil sets for vibration detection and the number of coil sets for geophone controlling. For example, if higher sensitivity is desired, more coil sets may be connected together and used for vibration detection with the trade-off that less number of coil sets are available for geophone controlling. In a particular scenario, all coil sets are connected and used for vibration detection, and no coil set is available for geophone controlling.

On the other hand, if controlling frequency response is required, more coil sets may be connected together and used for geophone controlling with the trade-off that a less number of coil sets are available for vibration detection. However, at least one coil set has to be used for vibration detection.

As described above, coil sets may be connected or combined during manufacturing of the geophone 100, or may, be combined by users by connecting respective terminals from the outside of the geophone 100. A geophone with some coil sets combined during manufacturing may be further customized by a user by connecting terminals from the outside of the geophone as the user desires.

Figure 24:
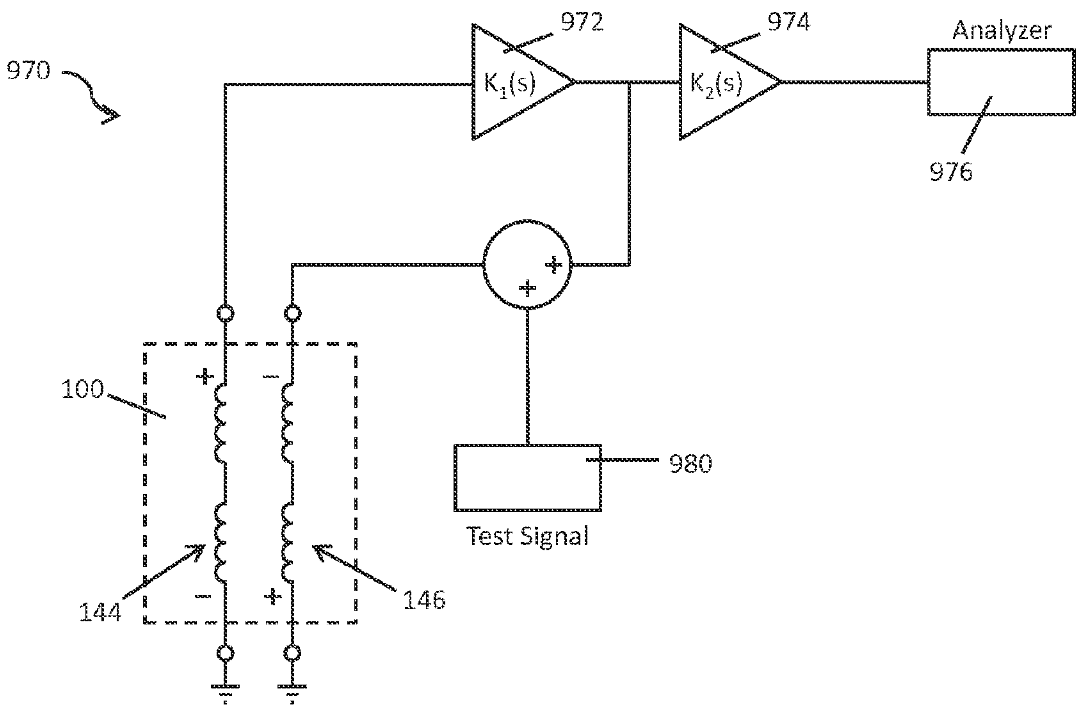
FIG. 24 is an electrical diagram of a dosed-loop geophone system, according to one embodiment.

FIG. 24 shows a simplified electrical diagram of a closed-loop geophone system 970 using a two-coil, four-terminal (2C4T) geophone 100. The inner coil set 144 of the geophone 100 is used for vibration detection, which outputs a vibration detection signal to a first amplifying circuit 972 having a transfer function $K_1(s)$. Hereinafter, amplifying circuits, including the amplifying circuit 972, may be an amplifier, and may include other circuits, such as a filter, as a system designer desires.

The amplifying circuit 972 amplifies the vibration detection signal and outputs the amplified signal to a second amplifying circuit 974 having a transfer function $K_2(s)$, which outputs the amplified signal to a signal analyzer 976 to determine the characteristics of the vibration detected by the geophone 100. The output of the first amplifying circuit 972 is also superimposed with a test signal generated by a test signal source 980, and fed back to the outer coil set 146 of the geophone 100 for controlling the response thereof.

The test signal source 980 is turned off or otherwise unconnected to the geophone system 970 in normal use, and is turned on in testing of the geophone 100 for injecting a test signal, e.g., a sinusoid signal, to the outer coil set 146 of the geophone 100.

In this example, the control signal is injected to the outer coil set 146 in an antiphase manner with respect to the vibration detection signal output from the inner coil set 144 such that the control signal generally causes a mechanical force applied to the movable coil structure 140 antiphase to the motion thereof to impede the motion of the movable coil structure 140. Consequently, the displacement distance of the coil structure under external vibration is controlled, and is generally compacted to a small distance. For example, in one embodiment, a feed-back control system as in FIG. 24 controls the movement of the coil structure, and compacts its displacement to within about 0.1 μm (micrometer) axially on either side from the stationary position of the coil structure. For comparison, the displacement of the coil structure of a conventional geophone is usually between 0.5 mm and 2 mm axially on either side from the stationary position of the coil structure.

Figure 25:
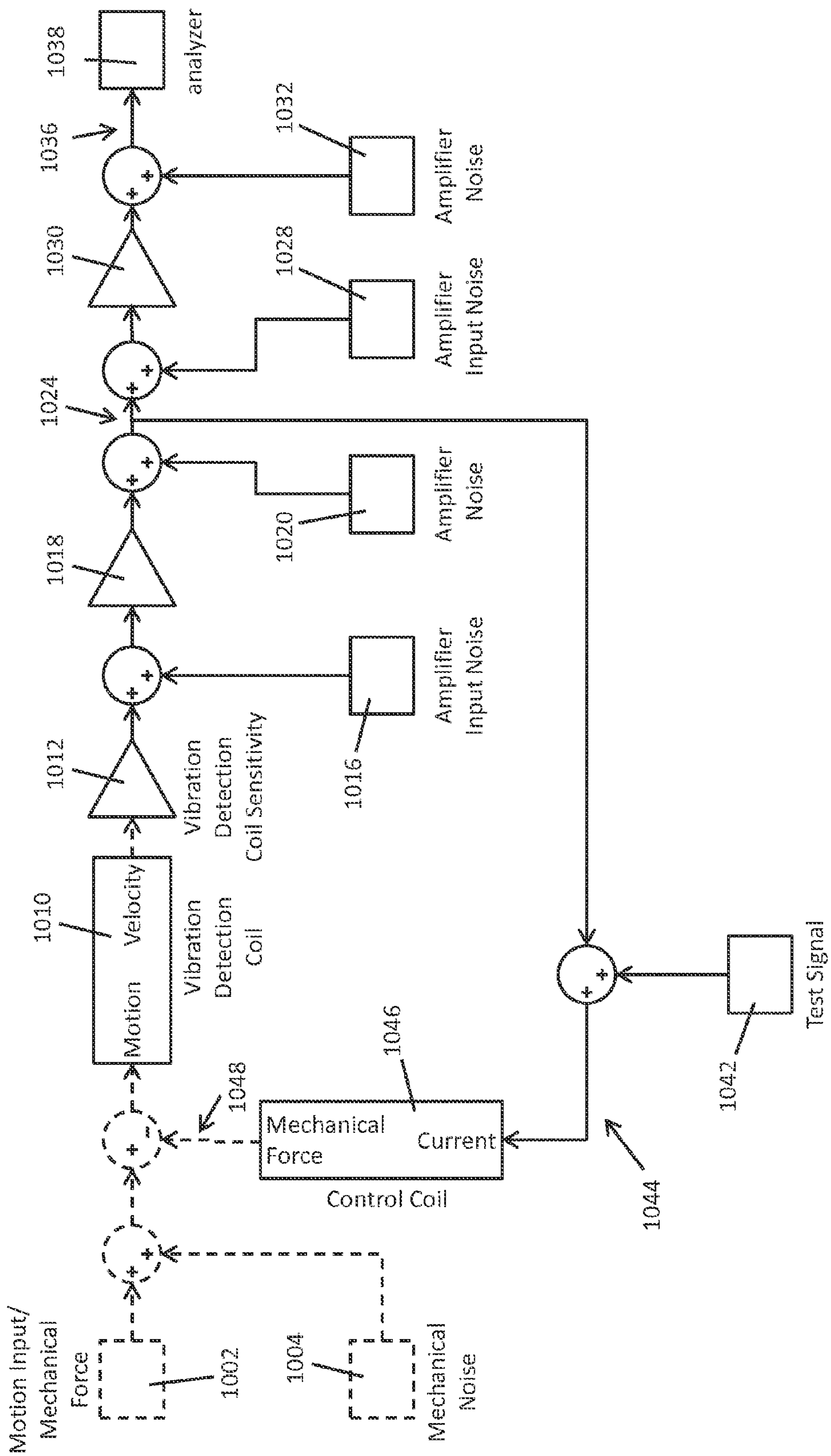
FIG. 25 is an analytical diagram showing the theory of the closed-loop geophone system.

FIG. 25 is an analytical diagram showing the theory of the closed-loop geophone system 970. In this figure, broken-line components and broken-line arrows represent mechanical components and signal paths, respectively. Solid-line components and solid-line arrows represent electrical components and signal paths, respectively.

As shown in FIG. 25, external vibration causes a motion or equivalently a mechanical force 1002 having a mechanical noise component 1004, which is superimposed with the feedback mechanical force 1048 (described later) in an antiphase manner (represented by the "+" and "−" signs in circle 1008), and then applied to the vibration detection coil set or coil sets 1010. The vibration detection coil set(s) 1010, in response to the force applied thereon, vibrates axially causing a velocity signal. Here, the vibration detection coil set(s) is partitioned to a mechanical component 1010 and a mechanical-electrical conversion component 1012, the latter being graphically represented herein by an amplifier symbol for indicating the vibration detection coil sensitivity.

The mechanical-electrical conversion component 1012 of the vibration detection coil set(s) converts the velocity input to a voltage signal as described before, wherein the magnitude of the voltage signal is dependent on the sensitivity of the vibration detection coil set(s). The vibration detection voltage signal output from the mechanical-electrical conversion component 1012 is injected into an amplifying circuit 1018 having a transfer function $K_1(s)$. As those skilled in the art understand, an amplifier input noise component 1016 is also injected into the amplifying circuit 1018. The output 1024 of the amplifying circuit 1018, including the amplified input signal and an amplifier noise component 1020, is output to a second amplifying circuit 1030 having a transfer function $K_2(s)$. Similarly, the second amplifying circuit 1030 also has an amplifier input noise 1028 injected at its input, and an amplifier noise 1032 in its output.

The output 1036 of the second amplifying circuit 1030 is sent to an analyzer device 1038 for further processing, such as calculating parameters of the external vibration.

In the feedback loop, the output 1024 of the amplifying circuit 1018, including the amplified vibration detection voltage signal and various noise components, is also superimposed with a test signal from a test signal source 1042, to form a control signal 1044 for feeding back to the control coil set(s) 1046 to control the response of the geophone 100. The test signal source 1042 is turned off or otherwise unconnected to the geophone system 970 in normal use, and is turned on in testing of the geophone 100 for injecting a test signal, e.g., a sinusoid signal, to the control coil set 1044 of the geophone 100.

The control signal 1044 is injected to the control coil set(s) 1046 in an antiphase manner. The control coil set(s) 1046 converts the electrical control signal 1044 to a feedback mechanical force 1048. As the control signal is injected to the control coil set(s) in an antiphase manner, the feedback mechanical force 1048 impedes the motion of the vibration detection coil.

By compacting the displacement of the movable coil structure, the multi-coil, multi-terminal, closed-loop geophone system 970 is capable of detecting high-magnitude vibration that would have otherwise caused the movable coil structure of a conventional open-loop geophone to reach its maximum displacement distance and saturated. Comparing to conventional open-loop geophone, the multi-coil, multi-terminal, closed-loop geophone system 970 also enjoys smaller harmonic distortion. As the displacement of the movable coil structure is generally small, the impact of the coil inductance is generally small. The manufacturing cost of the geophone 100 is generally reasonably low.

Figure 26:
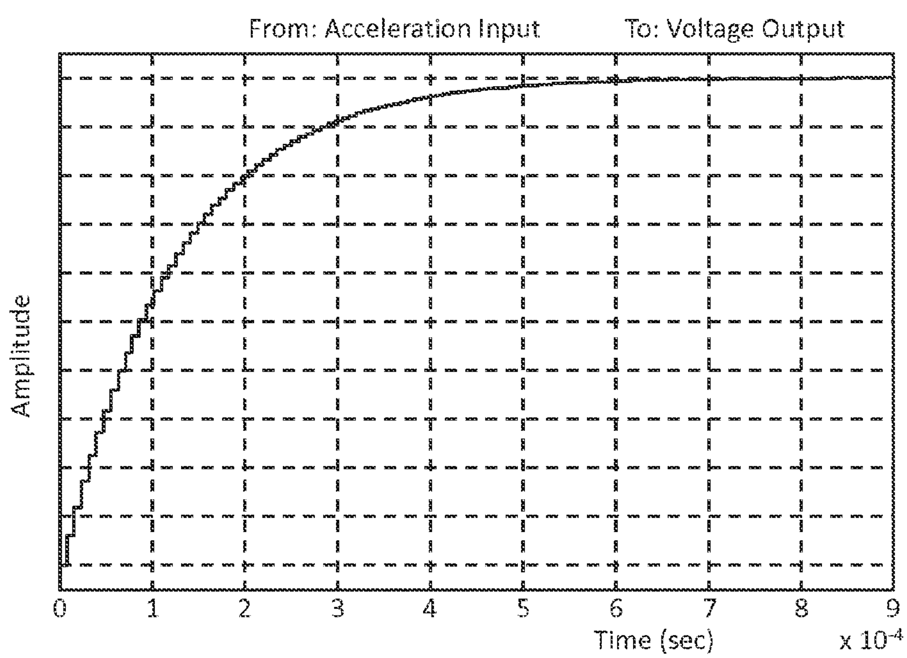
FIG. 26 shows the simulation result of the step response of a two-coil, four-terminal (2C4T), dosed-loop geophone.

FIG. 26 shows the simulation result of the step response of a 2C4T, dosed-loop geophone 100. The response time is about 0.3 ms (millisecond).

Figure 27A:
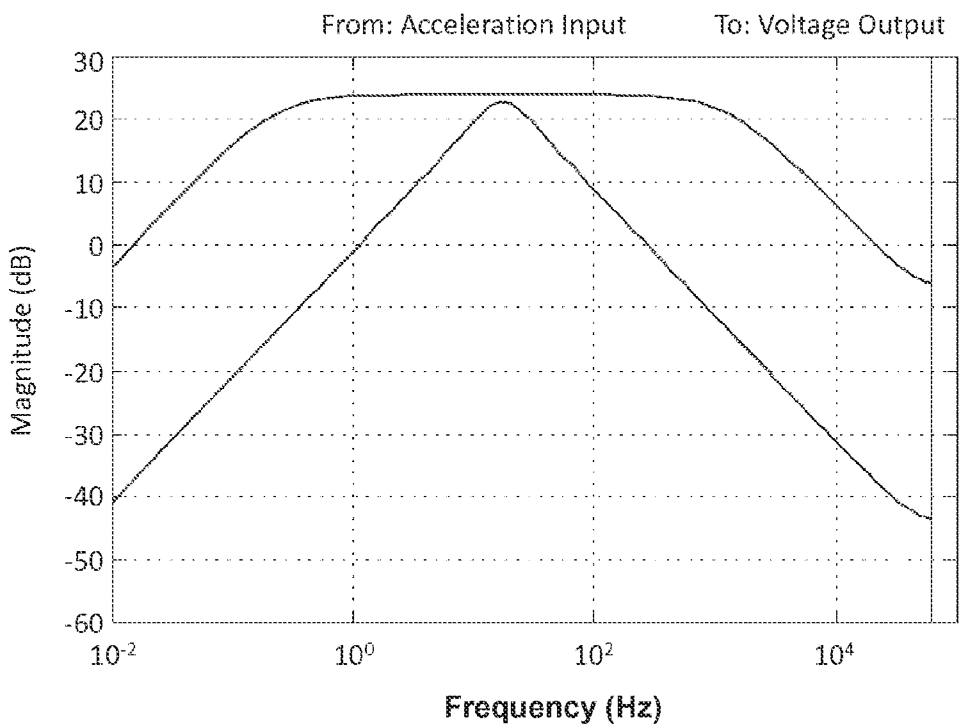
FIGS. 27A and 27B are the Bode magnitude and phase diagrams, respectively, of the 2C4T, closed-loop geophone.
Figure 27B:
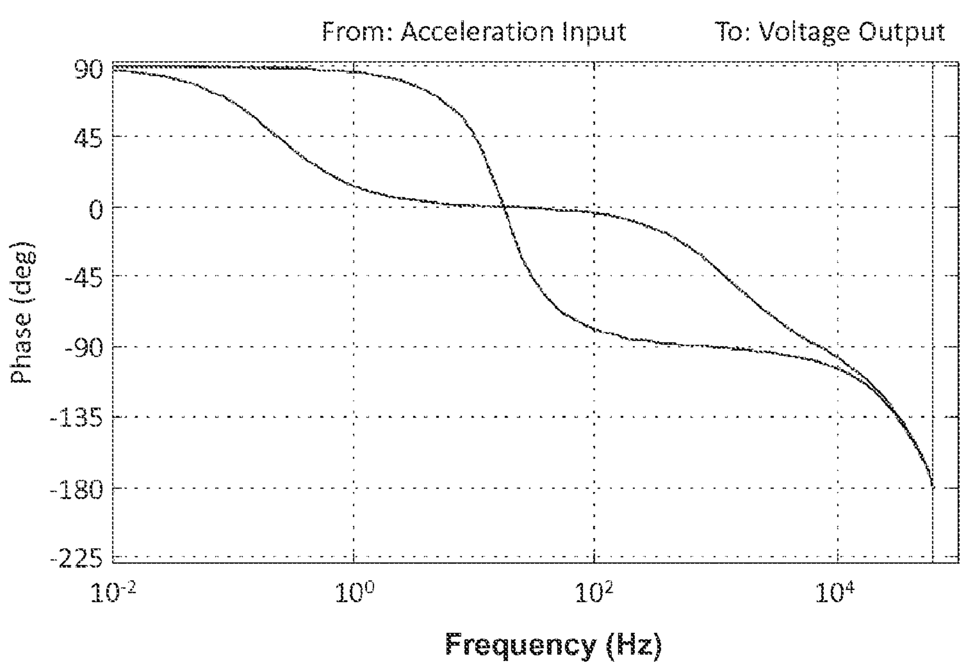

FIGS. 27A and 27B illustrate the Bode magnitude and phase diagrams of the two-coil four terminal closed-loop geophone 100 and a conventional open-loop geophone, respectively, obtained via simulation. In terms of the magnitude response, the 2C4T, closed-loop geophone has a much larger bandwidth, ranging from about 0.45 Hz to about 400 Hz. The 2C4T, closed-loop geophone also exhibits improved phase response when compared to the conventional open-loop geophone. In particular, the 2C4T, dosed-loop geophone exhibits significantly improved phase response in the frequency range from about 1 Hz to about 200 Hz.

Field tests of a 2C4T, closed-loop geophone have also been conducted. The field test results show improved geo-seismic data acquisition comparing to conventional open-loop geophones in terms of bandwidth, harmonic distortion and sensitivity.

Figure 28:
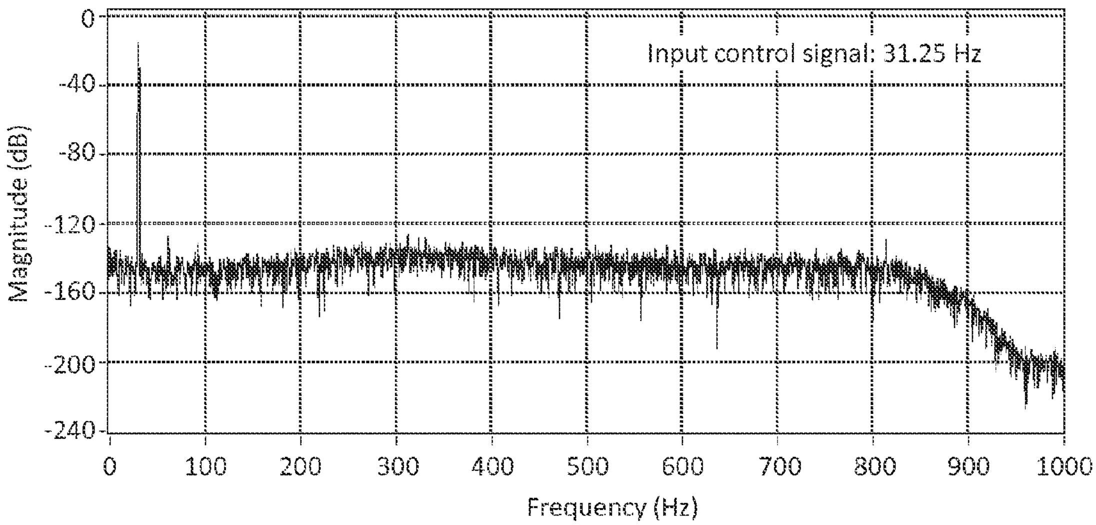
FIGS. 28 and 29 illustrate the total harmonic distortion and ambient noise test results of the 2C4T, closed-loop geophone.
Figure 29:
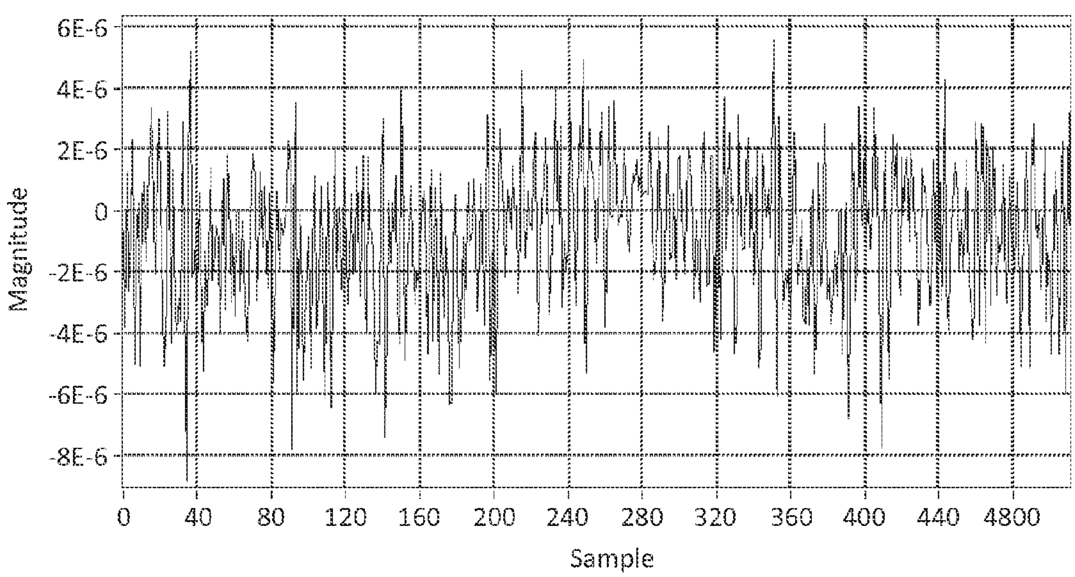

FIGS. 28 and 29 illustrate the total harmonic distortion and ambient noise test results of the 2C4T, closed-loop geophone tested using a 31.25 Hz sinusoidal test signal. The test results show substantially flat amplitude and phase spectra in a frequency bandwidth from about 0.45 Hz to about 400 Hz. The harmonic distortion of the 2C4T, closed-loop geophone is about −107 dB (0.0005%), comparing to that of the conventional open-loop geophone of about −60 dB (0.1%). The sensitivity of the 2C4T, closed-loop geophone is about 2.5 μg (volt per standard gravity). With the 2C4T, closed-loop geophone, the noise is reduced to less than 1 micro g (i.e., $10^{-6}$ g) with sampling frequency of 1000 Hz. The power consumption of the 2C4T, closed-loop geophone is about 8.5 mw (milliwatt) for a full scale 1 g design (i.e., a design that the maximum voltage output represents 1 g), and less than about 5 mw for full scale 0.6 g design (i.e., a design that the maximum voltage output represents 0.6 g). Moreover, the 2C4T, closed-loop geophone has a large dynamic range of about 120 dB, comparing to conventional open-loop geophone's the 60 dB dynamic range.

In the embodiment of FIG. 24, the first amplifying circuit 972, which may be considered as a controller, is located outside the geophone 100. In an alternative embodiment, first amplifying circuit 972 is implemented as a small printed circuit board assembly (PCB) incorporated in the housing of the geophone and forms a part thereof.

In another embodiment, the multi-coil, multi-terminal geophone further comprises a Analog-to-Digital (A/D) converter and a power supply such as a battery incorporated into the housing thereof. The A/D converter converts the analog vibration detection signal to a digital signal bearing vibration information for output. In yet another embodiment, the multi-coil, multi-terminal geophone outputs both the analog and the digital vibration detection signals. In still another embodiment, the power supply is external to the multi-coil, multi-terminal geophone, and the multi-coil, multi-terminal geophone comprises a set of terminals, e.g., two terminals or three terminals depending on the design, for receiving power from the external power supply.

Those skilled in the art appreciate that the electrical terminals may be marked using other suitable means. For example, colors may be used for indicating the phase relationship of the coil sets, and stripes may be used for indicating the grouping of terminals. Marks may be printed, engraved or otherwise attached to the housing and/or the terminals as the designer and/or user of the geophone desires.

As well known to those skilled in the art, the electrical terminals may be an electrically conductive extrusions extending from the housing, electrically conductive wires, electrically conductive contacts on the housing, or a mixture thereof. The metal housing may itself be an electrical terminal.

In an alternative embodiment, the housing is made of an electrically nonconductive material such as plastic, wood or the like. In this embodiment, the housing is not used as an electrical terminal or electrical ground.

What is claimed is:

1. An apparatus for detecting vibration, said apparatus comprising:

a housing;

a magnetic structure forming a magnetic field in the housing; and a coil structure comprising two or more sets of coils overlapped in said magnetic field concentric with the magnetic structure, said two or more sets of coils comprising at least a first and a second set of coils being intermingled, each of said at least first and second sets of coils comprising a first end and a second end for signal processing circuitry connection; wherein in response to said vibration, said coil structure and said magnetic structure are movable with respect to each other with the moving directions transverse the directions of the magnetic flux of the magnetic field.

2. The apparatus of claim 1 wherein at least the first set of coils outputs a sensing signal indicative of vibration.

3. The apparatus of claim 1 wherein at least two sets of coils are connected for outputting a sensing signal indicative of vibration.

4. The apparatus of claim 1 wherein at least the second set of coils receives a control signal for controlling the response of the apparatus to vibration.

5. The apparatus of claim 1 wherein at least two sets of coils are connected for receiving a control signal for controlling the response of the apparatus to vibration.

6. The apparatus of claim 4 wherein said response of the apparatus to vibration comprises at least one of the sensitivity to vibration and the frequency response to vibration.

7. The apparatus of claim 4 wherein said control signal is a function of the sensing signal.

8. The apparatus of claim 1 wherein all sets of coils are intermingled.

9. The apparatus of claim 1 wherein said two or more sets of coils further comprise a third set of coils being radially offset from said intermingled first and second sets of coils.

10. The apparatus of claim 1 wherein at least two sets of said two or more sets of coils are wound in the same direction.

11. The apparatus of claim 1 wherein at least two sets of said two or more sets of coils are wound in opposite directions.

12. The apparatus of claim 1 wherein said coil structure further comprises a hollow cylindrical structure for said at least two or more sets of coils to be wound thereabout.

13. The apparatus of claim 1 wherein said coil structure is movable.

14. The apparatus of claim 1 wherein said at least a portion of said housing is made of ferromagnetic material for regulating said magnetic field.

15. The apparatus of claim 1 wherein said magnetic structure is received in the coil structure.

16. The apparatus of claim 1 further comprises at least two groups of electrical terminals connectable from outside the housing, each group of electrical terminals connecting at least one set of coils.

17. The apparatus of claim 16 wherein said electrical terminals are marked by marks for indicating at least one of the phase relationship of signals on said two or more sets of coils and the groups of the electrical terminals.

18. The apparatus of claim 1 wherein a controller is electrically connected to said apparatus for controlling the response of said apparatus to external vibration.

19. The apparatus of claim 18 wherein said controller is external to said apparatus.

20. The apparatus of claim 18 wherein said controller is incorporated in the housing of said apparatus.

21. A method of detecting vibration comprising:

forming a magnetic field;

intermingling at least a first coil set and a second coil set axially in space, each of said first and second sets of coils comprising a first end and a second end for signal processing circuitry connection;

positioning the at least a first coil set and a second coil set in said magnetic field such that, in response to said vibration, the magnetic field and the at least a first coil set and a second coil set are movable with respect to each other with moving directions transverse the directions of the magnetic flux of the magnetic field;

detecting, from said first coil set, a sensing signal bearing information of said vibration; and applying a control signal to said second coil set for controlling said sensing signal.

22. The method of claim 21 further comprising:

determining the control signal based on said sensing signal.

23. The apparatus of claim 1 wherein each of said first and second sets of coils winds in said magnetic field and forms a first portion having a first winding direction and a second portion having a second winding direction, said first winding direction being opposite to said second winding direction.

* * * * *